US009522842B2

(12) United States Patent
Nonnet et al.

(10) Patent No.: US 9,522,842 B2
(45) Date of Patent: Dec. 20, 2016

(54) VITROCERAMIC GLASS COMPOSITIONS FOR GASKETS OF APPARATUSES OPERATING AT HIGH TEMPERATURES AND ASSEMBLING METHOD USING SAID COMPOSITIONS

(75) Inventors: Hélène Nonnet, Sarrians (FR); Andrew Connelly, York (GB); Hichem Khedim, Nimes (FR)

(73) Assignee: Commissariat a l'énergie atomique et aux énergies alternatives, Paris (FR)

( * ) Notice: Subject to any disclaimer, the term of this patent is extended or adjusted under 35 U.S.C. 154(b) by 292 days.

(21) Appl. No.: 13/638,561

(22) PCT Filed: Mar. 31, 2011

(86) PCT No.: PCT/EP2011/055057
§ 371 (c)(1),
(2), (4) Date: Dec. 19, 2012

(87) PCT Pub. No.: WO2011/121095
PCT Pub. Date: Oct. 6, 2011

(65) Prior Publication Data
US 2013/0108946 A1    May 2, 2013

(30) Foreign Application Priority Data

Apr. 1, 2010 (FR) ..................... 10 52467

(51) Int. Cl.
*C03C 10/00* (2006.01)
*C03C 3/066* (2006.01)
(Continued)

(52) U.S. Cl.
CPC .......... *C03C 10/0036* (2013.01); *C03C 3/066* (2013.01); *C03C 3/068* (2013.01); *C03C 8/02* (2013.01);
(Continued)

(58) Field of Classification Search
CPC .......... C03C 3/087; C03C 3/078; C03C 3/062; C03C 3/064; C03C 10/0036; C03C 10/00; C03C 10/0054; C03C 10/0009
(Continued)

(56) References Cited

U.S. PATENT DOCUMENTS 3,847,627 A * 11/1974 Erickson et al. ............... 501/38
4,366,251 A * 12/1982 Rapp ............................... 501/36
(Continued)

FOREIGN PATENT DOCUMENTS

CN    101072676 A    11/2007
EP    1 059 271 A1    12/2000
(Continued)

OTHER PUBLICATIONS

Eichler, et al., "BAS (BAO—Al2O3—SIOs2)-glasses for High Temperature Applications", J. of European Ceramic Society, 1991, vol. 19, pp. 1101-1104.
(Continued)

*Primary Examiner* — Noah Wiese
(74) *Attorney, Agent, or Firm* — Knobbe, Martens Olson & Bear LLP

(57) ABSTRACT

A vitroceramic glass composition consisting of $SiO_2$, $Al_2O_3$, and CaO or of $SiO_2$, $Al_2O_3$, CaO and SrO or of $SiO_2$, $Al_2O_3$ and $La_2O_3$ is provided. In addition, a method and assembly of at least two parts using said composition is provided. Also, a gasket and assembly obtained by this method as well as a high temperature electrolyzer (HTE) or solid oxide fuel cell (SOFC) comprising this gasket or this assembly are provided.

42 Claims, 10 Drawing Sheets

(51) Int. Cl.
*C03C 3/068* (2006.01)
*C03C 8/02* (2006.01)
*C03C 8/24* (2006.01)
*C03C 29/00* (2006.01)
*C04B 37/02* (2006.01)
*H01M 8/02* (2016.01)
*H01M 8/12* (2016.01)

(52) U.S. Cl.
CPC .............. C03C 8/24 (2013.01); C03C 29/00 (2013.01); C04B 37/025 (2013.01); H01M 8/0215 (2013.01); H01M 8/0282 (2013.01); *C04B 2235/656* (2013.01); *C04B 2235/6562* (2013.01); *C04B 2235/6565* (2013.01); *C04B 2235/6567* (2013.01); *C04B 2237/064* (2013.01); *C04B 2237/068* (2013.01); *C04B 2237/10* (2013.01); *C04B 2237/348* (2013.01); *C04B 2237/402* (2013.01); *C04B 2237/403* (2013.01); *C04B 2237/405* (2013.01); *C04B 2237/60* (2013.01); *C04B 2237/72* (2013.01); *H01M 8/12* (2013.01); *Y02E 60/50* (2013.01)

(58) Field of Classification Search
USPC .............................. 501/8, 10, 70, 72, 73, 77
See application file for complete search history.

(56) References Cited

U.S. PATENT DOCUMENTS

| | | | |
|---|---|---|---|
| 4,921,738 A | 5/1990 | Cassidy | |
| 5,453,331 A | 9/1995 | Bloom et al. | |
| 5,576,252 A * | 11/1996 | Rapp et al. | ...................... 501/35 |
| 6,430,966 B1 | 8/2002 | Meinhardt et al. | |
| 6,532,769 B1 | 3/2003 | Meinhardt et al. | |
| 6,656,625 B1 | 12/2003 | Thompson et al. | |
| 6,828,263 B2 | 12/2004 | Larsen et al. | |
| 7,229,286 B2 * | 6/2007 | Jones | ................... A61K 6/0273 433/212.1 |
| 7,410,921 B2 * | 8/2008 | Pinckney | ................ C03B 19/06 501/15 |
| 7,470,640 B2 | 12/2008 | Badding et al. | |
| 8,002,166 B2 | 8/2011 | Nielsen et al. | |
| 2008/0090715 A1 | 4/2008 | Badding et al. | |
| 2010/0119917 A1 * | 5/2010 | Kumar et al. | ................... 429/35 |

FOREIGN PATENT DOCUMENTS

| | | |
|---|---|---|
| JP | S62-123042 A | 6/1987 |
| JP | S62123042 A | 6/1987 |
| JP | 2000-327428 A | 11/2000 |
| JP | 2000327428 A | 11/2000 |
| WO | 96/5626 A1 | 2/1996 |
| WO | 99/54131 A1 | 10/1999 |
| WO | 2006044593 A2 | 4/2006 |
| WO | 2006/069753 A1 | 7/2006 |
| WO | 2007/120546 A2 | 10/2007 |

OTHER PUBLICATIONS

Bahadur, et al., "Influence of Nucleating Agents on the Chemical Interaction of MgO—Al2O3—SiO2—B2O3 Glass Sealants with Components of SOFCs", Journal of the Electrochemical Soiciety, 2004, vol. 151, No. 4, pp. A558-A562.

Flugel, et al., "Development of an Improved Devitrifiable Fuel Cell Sealing Glass: I. Bulk Properties", Journal of the Electrochemical Society, 2007, vol. 154, No. 6, pp. B601-B608.

Lahl, et al., "Crystallisation kinetics in AO—Al2O3—SiO2—B2O3 glasses (A—Ba, Ca, Mg)", Journal of Materials Science, 2000, vol. 35, pp. 3089-3096.

Loehman, et al., "Engineered Glass Composites for Sealing Solid Oxide Fuel Cells", Presented at the SECA Core Technology Program Review, May 11-14, 2004, Boston, 23 pages.

Ley, et al., "Glass-ceramic sealants for solid oxide fuel cells: Part I. Physical Properties", J. Mater. Res., 1996, vol. 11, No. 6, pp. 1489-1493.

Meinhardt, et al., "Synthesis and properties of a barium aluminosilicate solid oxide fuel cell glass-ceramic sealant", Journal of Power Sources, 2008, vol. 182, pp. 188-196.

Zheng, et al., "SiO2—CaO—B2O3—Al2O3 ceramic glaze as sealant for planar ITSOFC", Journal of Power Sources, 2004, vol. 128., pp. 165-172.

Pascual, et al., "Optimization of glass-ceramic sealant compositions in the system MgO—BaO—SiO2 for solid oxide fuel cells (SOFC)", Journal of Power Sources, 2007, vol. 169, pp. 40-46.

Shelby, "Formation and Properties of Calcium Aluminosilicate Glasses", Journal of American Ceramic Society, vol. 68, No. 3, Mar. 1985, pp. 155-158.

Sakaki, et al., "Glass-ceramics sealants in Cao-Al2O3-SiO2 system", Proceedings of the Fifth International Symposium on Solid Oxide Fuel Cells (SOFC-V), vol. 97-18, 1997, pp. 652-660.

Geasee, "Doctoral Thesis: Entwicklung von kristallisierenden Glasloten fur planare Hochtemperatur-Brennstoffzellen (Development of crystallizing glass sealants for high temperature planar solid oxide fuel cells)", Feb. 17, 2003, Aachen, Germany, 86 pages. English Abstract is enclosed.

Illig, et al., "ABC Glas", 1991, Deutscher Verlag für Grundstoffindustrie, Leipzig, p. 121.

International Search Report issued on Sep. 28, 2011 for International Application No. PCT/EP2011/055057.

Ota, et al., "Structure and some physical properties of SiO2—Al2O3—CaO—ZnO glass", Journal of Society of Materials Science, Japan, vol. 42, No. 476, pp. 467-472, May 1993.

Clayden, et al., "Solid State 27 Al NMR and FTIR study of lanthanum aluminosilicate glasses", Journal of Non-Crystalline Solids, vol. 258, pp. 11-19, 1999.

* cited by examiner

VITROCERAMIC GLASS COMPOSITIONS FOR GASKETS OF APPARATUSES OPERATING AT HIGH TEMPERATURES AND ASSEMBLING METHOD USING SAID COMPOSITIONS

CROSS REFERENCE TO RELATED APPLICATIONS

This application is the U.S. National Phase of International Application No. PCT/EP2011/055057, filed Mar. 31, 2011, designating the U.S. and published as WO 2011/121095 on Oct. 6, 2011 which claims the benefit of French Patent Application No. 10 52467 filed Apr. 1, 2010.

TECHNICAL FIELD

The invention relates to vitroceramic glasses compositions, and more particularly to vitroceramic glass compositions for gaskets, seals of apparatuses, devices operating at high temperatures, for example from 600 to 1,000° C. notably from 700 to 900° C.

More specifically, the invention relates to glass compositions for gaskets, seals of a High Temperature Electrolyzer (HTE) or of a High Temperature Fuel Cell, (SOFC or Solid Oxide Fuel Cell) comprising a stack of elementary cells.

The invention further relates to a method for assembling at least two parts applying said glass compositions. These parts are notably parts which enter the structure of a High Temperature Electrolyzer (HTE) or of a High Temperature Fuel Cell (SOFC or Solid Oxide Fuel Cell).

The technical field of the invention may thus be generally defined as that of glass gaskets, the function of which is to provide the seal between the different compartments of devices, apparatuses in which fluids are conveyed at high temperatures. More particularly, the technical field of the invention is that of glass gaskets ensuring the seal between the different compartments in which gases are transported and produced in high temperature electrolyzers or high temperature fuel cells, notably those comprising a stack of elementary cells which generally operate between 600 and 1,000° C., in particular between 700° C. and 900° C.

These gaskets are generally placed in contact with ceramics and/or metals.

BACKGROUND

In high temperature electrolyzers, electrolysis of water at high temperature is carried out from vaporized water. The function of a high temperature electrolyzer is to transform steam into hydrogen and oxygen according to the following reaction: $2H_2O_{(g)} \rightarrow 2H_2 + O_2$.

This reaction is conducted via an electrochemical route in the cells of the electrolyzer.

Each elementary cell consists, as this is shown in FIG. 1, of two electrodes, i.e. an anode (1) and a cathode (2), sandwiching a solid electrolyte generally in the form of a membrane (3).

Both electrodes (1, 2) are electron conductors, and the electrolyte (3) is an ion conductor.

The electrochemical reactions occur at the interface between each of the electron conductors and the ion conductor.

At the cathode (2), the half-reaction is the following:
$2H_2O + 4e^- \rightarrow 2H_2 + 2O^{2-}$;
And at the anode (1), the half-reaction is the following:
$2O^{2-} \rightarrow O_2 + 4e^-$.

The electrolyte (3), placed between both electrodes, is the migration site of the $O^{2-}$ ions (4) under the effect of the electric field generated by the potential difference imposed between the anode (1) and the cathode (2).

An elementary reactor, illustrated in FIG. 2, consists of an elementary cell (5) as described above, with an anode (1), an electrolyte (3), and a cathode (2) and of two monopolar connectors or more exactly two half-interconnectors (6, 7) which provide electric, hydraulic and thermal functions. This elementary reactor is called a module.

In order to increase the produced hydrogen and oxygen flow rates, and as this is shown in FIG. 3, several elementary modules are stacked (8), the cells (5) then being separated by interconnectors or bipolar interconnection plates (9).

The assembly of the modules (8) is positioned between two upper (10) and lower (11) interconnection plates which bear electric power supplies and gas supplies (12). This is then referred to as a stack (FIG. 3).

There exist two concepts, configurations, architectures for the stacks:
tubular stacks, in which the cells are tubes, and
planar stacks, in which the cells are made as plates like in FIG. 3.

In the planar architecture, the cells and the interconnectors are in contact in many points. The manufacturing of the stack is subject to fine tolerances as to the flatness of the cells in order to avoid too high contact pressures and an inhomogeneous distribution of the stresses, which may lead to cracking of the cells.

The seal gaskets in a stack have the purposes of preventing a hydrogen leak from the cathode to the neighboring anodes, of preventing an oxygen leak from the anode to the neighboring cathodes, of preventing a hydrogen leak towards the outside of the stack, and finally of limiting the steam leaks from the cathodes towards the anodes.

Within the scope of the development of a stack for high temperature electrolysis (HTE), and as this is shown in FIG. 4, gas-proof gaskets (13) are thus made between the planar electrolysis cells (5) (this positioning, this configuration of the gaskets, seals is only an example among many positionings and configurations of the gaskets), each consisting of an anode/electrolyte/cathode ceramic trilayer, and the metal interconnectors or interconnection plates (9).

It should be noted that the dimensions in μm given in FIG. 4 are only given as examples.

More specifically, a gasket is made between the lower surface of each cell (5) and the upper half-interconnector (14) of the interconnection plate located below the cell, on the one hand, and between the upper surface of each cell and the lower half-interconnector (15) of the interconnection plate located above the cell (5) on the other hand.

These gaskets (13) should generally have a leak rate in air of less than $10^{-3}$ Pa·m$^3$·s$^{-1}$ between 700° C. and 900° C. under a pressure difference from 20 to 500 mbars.

In addition to this seal function, the gasket may, in certain cases, have secondary assembling and electric conduction functions. In other cases, notably in the case of HTEs, it is rather required that the gasket be not an electric conductor. For certain stack architectures, a ceramic part, called a cell support, may be placed between the cells and the interconnectors; and gas-proof gaskets are then also required with this cell-supporting part.

It should be noted that the description which is made above of the stacks as well as of the arrangement of the gaskets is only given as an example. There exist many architectures for these stacks and there also exist many configurations for the gaskets which we shall not detail here for the sake of simplification.

The present invention is of general application regardless of the nature, the geometry, the architecture of the stacks, and of the configuration and location of the gaskets.

Several seal solutions are presently being studied, i.e.: cements or ceramic adhesives, glass or vitroceramic gaskets, metal compressive gaskets, mica compressive gaskets, brazed gaskets and mixed solutions resorting to several of these techniques.

These gaskets should give the possibility of providing the seals between the cathode chamber and the outside, between the anode chamber and the outside, and between both chambers, and thereby avoid gas leaks between both chambers and towards the outside.

As this has already been specified above, we are more particularly interested in glass gaskets herein.

The glasses used for these gaskets may either be made of a simple glass, or made of a crystallizable glass also called a vitroceramic, or further made of a mixture of both of these glasses, or further made of a simple glass to which ceramic particles are added.

Most glasses used for these gaskets are generally found in solid form at the temperature of use, i.e. generally between 600° C. and 1,000° C., notably between 700° C. and 900° C., for example 850° C. These gaskets are described as <<hard>> gaskets.

The main constraint to be observed in this situation is to formulate a gasket having a thermal expansion coefficient <<TEC >>, adapted to the other elements of the junction, notably to the parts made of ceramics and to the metal parts.

As regards simple glasses, $SiO_2$—$CaO$—$B_2O_3$—$Al_2O_3$ compositions are studied in document [1], $BaO$—$Al_2O_3$—$SiO_2$ (BAS) compositions are described in document [2] and in document [3], and finally $Li_2O$—$Al_2O_3$—$SiO_2$ compositions are mentioned in document [4], but it is difficult with these compositions to attain TECs adapted to the junctions.

Vitroceramic glasses (or more simply vitroceramics) are, as for them, generally shown as being more chemically and mechanically resistant by controlling the crystallization of the glass with nucleating agents and with particular heat treatments.

These vitroceramic glasses have particular compositions, which ensures that these glasses are amorphous when they are melted during their elaboration, but they then partly or totally crystallize after a suitable heat treatment.

The sought goal is to form crystalline phases which on average will give the gasket a high thermal expansion coefficient, so as to be able to accommodate expansions during thermal cycling operations to which the ceramic/gasket/metal or metal/gasket/metal assemblies will have to be subjected.

The parameters to be controlled for these vitroceramic glasses are the formulation of the glass and the thermal cycles in order to manage to form the crystalline phase(s) having the sought properties.

Many vitroceramic glasses compositions have already been described.

Thus, vitroceramic glass compositions comprising $SiO_2$, BaO, and $Al_2O_3$, and optionally SrO, CaO, $K_2O$ or $B_2O_3$ are mentioned in documents [6] and [7].

Vitroceramic glasses compositions based on $SiO_2$, BaO, CaO, $Al_2O_3$, $B_2O_3$, and optionally $La_2O_3$ are the subject of document [8].

Vitroceramic glasses compositions comprising the $SiO_2$, $Al_2O_3$, $B_2O_3$, $La_2O_3$, and SrO oxides are described in document [9].

Vitroceramic glasses compositions comprising BaO, CaO, $Al_2O_3$, $SiO_2$ oxides, and optionally ZnO, PbO, $B_2O_3$ or $V_2O_5$ are mentioned in document [10]. Such compositions are compositions said to be of the BCAS family or of the BCAS type [10].

Vitroceramic glasses compositions comprising BaO, $B_2O_3$, $Al_2O_3$, $SiO_2$ oxides are the subject of document [11]. Such compositions are compositions said to be of the BAS family, or of the BAS type.

Vitroceramic glasses compositions comprising $SiO_2$, $Al_2O_3$, $B_2O_3$, MgO oxides are described in document [12].

Vitroceramic glasses compositions comprising $SiO_2$, BaO, $B_2O_3$, $Al_2O_3$ oxides, and optionally $Ta_2O_5$, SrO, CaO, MgO, $Y_2O_3$, $La_2O_3$ oxides are mentioned in document [13].

Vitroceramic glasses compositions comprising $SiO_2$, BaO, ZnO, $B_2O_3$, MgO oxides are described in document [14].

Vitroceramic glasses compositions comprising $SiO_2$, $Al_2O_3$, CaO oxides and optionally SrO, BaO, MgO, ZnO, $Nb_2O_5$, $Ta_2O_5$, $K_2O$, $GeO_2$, and $La_2O_5$ oxides are described in document [15].

Vitroceramic glasses compositions comprising $SiO_2$, CaO, BaO, $Al_2O_3$ oxides and optionally SrO oxide are mentioned in document [16].

Compositions of vitroceramic glasses comprising $SiO_2$, CaO, MgO, $Al_2O_3$ oxides are the subject of document [17].

However, the development of formulations and of heat treatments for vitroceramic glasses remains delicate since the junction material changes over time, with modification of the crystalline phases and because of the creation of interfaces between the materials in contact. Industrial development of this type of vitroceramic glasses therefore remains complex.

Most vitroceramic glasses compositions mentioned above therefore have drawbacks, in particular related to the fact that they interact with the substrates with which they are in contact, which then causes degradations reducing the performances of the systems such as fuel cells and high temperature electrolyzers, in which these compositions are applied.

The addition of ceramic particles of different sizes and shapes to simple glasses gives the possibility of controlling and adjusting the viscosity and the TEC of the sealing material [18, 19]. The delicate point lies in the presence of a glassy phase in a large amount which may pose corrosion or evaporation problems at high temperature.

In addition to the <<hard>> gaskets described above which appear in solid form at the operating temperature, $SrO$-$La_2O_3$—$Al_2O_3$—$B_2O_3$—$SiO_2$ compositions, with which a fluid state of the glass may be obtained at operating temperatures, are disclosed in document [5]. These compositions give the possibility of accommodating large TEC differences, but the formulations developed in this document do not prove to be sufficiently resistant from a mechanical point of view, exactly because of this too large fluidity of the glass, so as to be able to maintain the seal against the imposed pressure differences.

It emerges from the foregoing that presently there does not exist any glass composition and more particularly any glass composition belonging to the family of vitroceramics giving satisfaction for a use in seal gaskets for devices, apparatuses operating at high temperatures such as high temperature electrolyzers or high temperature fuel cells.

Therefore there exists a need for a glass composition, and more particularly for a glass composition belonging to the family of vitroceramics, with which it is possible to create a solid gasket, seal, suitable for the seal function for high temperature application for example in high temperature electrolyzers or high temperature fuel cells.

In other words, there exists a need for a glass composition, and more particularly for a glass composition of the vitroceramic type which gives a chemically and mechanically resistant gasket, seal, notably having mechanical properties allowing it to be adapted to the sometimes very different TECs of the very diverse materials, to be assembled with which it is in contact, such as metals and/or ceramics, notably during heating and cooling cycles.

In other words, and more specifically, there exists a need for a glass composition, and more particularly for a glass composition of the vitroceramic type (also called a vitroceramic composition) which advantageously has a high expansion coefficient allowing it to accommodate the different TECs of the materials with which it is found in contact, notably during heating and cooling cycles.

There also exists a need for a glass composition and more particularly for a glass composition of the vitroceramic type which is not subject to corrosion or evaporation phenomena at high temperatures.

There further and especially exists a need for such a glass composition, which does not have or has only very little interactions with the materials to be assembled. In other words, the interactions of the glass composition with materials of the various substrates with which it comes into contact, notably when this composition is applied as a gasket for assembling these substrates, has to be limited, or even nonexistent.

The glass composition should have the properties listed above, notably absence or quasi-absence of interaction with the material(s) of the substrate(s) and a TEC adapted to the material(s) of the substrate(s) regardless of this(these) material(s), whether these are ceramics such as zirconia stabilized with yttrium or YSZ, or Macor®, and/or metals or alloys such as iron-based alloys such as Crofer®, or F18TNb®, or nickel-based alloys such as Haynes® 230.

Finally, there exists a need for a glass composition which may be prepared in a reliable, easy and reproducible way without notably resorting to complex thermal cycles.

Finally there exists a need for such a glass composition, all the properties of which remain stable over time, in particular under conditions of high temperatures.

SUMMARY OF THE INVENTION

The goal of the present invention is to provide a glass composition which inter alia meets the needs listed above.

The goal of the present invention is further to provide a glass composition which does not have the drawbacks, defects, limitations and disadvantages of the glass compositions of the prior art and which solves the problems of the compositions of the prior art.

This goal, and still other ones, are achieved, according to the invention by a vitroceramic glass composition characterized in that it is selected from the group consisting of (composed of):

A glass composition (A) consisting of, in molar percentages:
36 to 43% of $SiO_2$, preferably 36 to 42% of $SiO_2$;
9 to 13% of $Al_2O_3$, preferably 9 to 12% of $Al_2O_3$;
38 to 50% of CaO; and optionally of one or several oxide(s) selected from the following oxides in the following molar percentages:
4 to 5% of ZnO;
2 to 9% of $MnO_2$;
2 to 6% of $B_2O_3$;
0.1 to 1% of $Cr_2O_3$, preferably 0.4 to 1% of $Cr_2O_3$;
0.1 to 4% of $TiO_2$, preferably 2 to 4% of $TiO_2$;

A glass composition (B) consisting of, in molar percentages:
43 to 48% of $SiO_2$;
4 to 5% of $Al_2O_3$;
8 to 10% of CaO;
34 to 39% of SrO; and optionally of one or several oxide(s) selected from the following oxides in the following molar percentages:
4 to 5% of ZnO;
2 to 9% of $MnO_2$;
2 to 5% of $B_2O_3$;
0.1 to 1% of $Cr_2O_3$;

A glass composition (C) consisting of, in molar percentages:
61 to 65% of $SiO_2$;
14 to 15% of $Al_2O_3$;
18 to 20% of $La_2O_3$; and optionally of one or several oxide(s) selected from the following oxides in the following molar percentages:
4 to 5% of ZnO;
4 to 5% of $MnO_2$;
2 to 3% of $B_2O_3$;
4 to 5% of CaO;
0.1 to 1% of $Cr_2O_3$.

It is quite understood that the total of the molar percentages of all the oxides constituting each of the glass compositions (A), (B) or (C), is equal to 100%.

The compositions according to the invention, which may be defined as new families of glasses formulations belonging to the family of vitroceramics, are not described in the prior art as illustrated by the documents cited above, do not have the defects and disadvantages of the compositions of the prior art and provide a solution to the problems of the compositions of the prior art.

The compositions according to the invention meet the needs and criteria listed above for these compositions.

The glasses composition according to the invention are vitroceramic glasses compositions, which may also be called vitroceramic compositions, which means that these compositions do not comprise any crystalline phase at the end of their elaboration, for example at a temperature which may range up to 1,500° C. on the one hand, and that, after an adequate heat treatment, carried out after their elaboration, these glass compositions comprise more than 50% by weight of crystalline phase, preferably 100% by weight of crystalline phase on the other hand.

The compositions according to the invention only consist of an amorphous glassy phase at the end of their elaboration and before any (other) heat treatment, any other operation maintaining them at a high temperature. In other words at the end of their elaboration, and before any other heat treatment, the glass compositions according to the invention are generally of a perfectly amorphous nature and consist of 100% glassy components.

Further, the glass compositions according to the invention after maintaining them at a temperature plateau from 600 to 1,000° C., notably from 700° C. to 950° C., for example from 800 to 900° C., more specifically from 800 to 850° C. for a duration of more than 1 hour, preferably from 50 to 720 hours, still preferably from 50 to 100 hours, said temperature plateau being reached by observing one or several ramp(s) for raising temperature, at a rate of 0.5 to 3° C./minute; comprise more than 50% by weight of crystalline phase or crystalline components, and preferably 100% by weight of crystalline phase or crystalline components, and consequently less than 50% of amorphous glassy phase or glassy components and preferably 0% by weight of amorphous glassy phase or glassy components.

In other words, the glass compositions according to the invention which initially are, at the end of their elaboration, of a amorphous glassy nature, i.e. they do not have any crystallization of glass, include more than 50% of crystalline phase after maintaining them at high temperatures such as the operating temperatures of high temperatures electrolyzers or fuel cells which are generally from 600° C. to 1,000° C., notably from 700° C. to 950° C., for example from 800° C. to 900° C., more specifically from 800 to 850° C. for a duration of more than one hour and which may range up to 1 month or 720 hours.

The glass compositions according to the invention give the possibility of creating a seal between ceramic substrates, parts made of metal or metal alloys, or between ceramic substrates, ceramic parts or further between ceramic substrates, ceramic parts and substrates, parts made of metals. Indeed, the glasses according to the invention, initially, after elaboration, being of a totally glassy, amorphous nature, are transformed, are modified into vitrocrystalline materials after suitable heat treatment, generally under the conditions mentioned above which are those prevailing in devices such as electrolyzers or fuel cells operating at high temperatures.

The term of <<vitrocrystalline>> is used since these materials always include a glassy phase remainder.

These vitrocrystalline materials form solid bonds with the materials and only create very limited interactions or even do not create any interactions with the materials.

All the glass compositions according to the invention A, B and C inter alia allow creation of a solid gasket, seal, suitable for the seal function whether this gasket/joint is in contact either only with ceramics or only with metals, or further with ceramics and metals.

The compositions according to the invention also have, as this has already been specified above, the surprising advantage of only having a low interaction level, or even no interactions at all with the materials with which they are in contact, whether these are ceramics such as ceramics of the <<YSZ>> or <<MACOR>> type; metals and alloys such as steels with high chromium content (Crofer® or F18TNb®), nickel alloys with high chromium content (Haynes® 230); or still further electrolytes such as the electrolyte of the LSM type; or further Cermets such as Ni Cermet.

Surprisingly, the compositions according to the invention have this very low level or this total absence of interaction with the substrate in combination with high expansion coefficients for example from 6 to $12.10^{-6}$° $C.^{-1}$, which allows them to accommodate the different TECs which the materials may have, said materials being the materials with which said compositions are in contact during heating and cooling cycles.

The glass transition temperature of the compositions according to the invention is generally less than the preferred operating temperatures of the high temperatures electrolyzers or fuel cells which are generally from 700° C. to 900° C., and for example from 800° C. to 850° C.

Thus, the glass transition temperatures of the compositions (A), (B) and (C) are themselves from 730° C. to 850° C. respectively.

The glass composition according to the invention is selected from the group consisting of the compositions (A), (B) and (C).

These compositions belong to three families of glasses and all these compositions meet the needs and criteria mentioned above and provide a solution to these problems. In particular, all these compositions create solid and leak-proof gaskets, which interact very little or not with the materials of substrates such as those mentioned above and have high TECs.

The composition (A) belongs to the so-called CAS family: Calcium Alumino Silicate, which is formulated for its properties of strong chemical durability and which has a high TEC.

The composition (B) belongs to the so-called SCAS family: Strontium Calcium Alumino Silicate, which differs from the previous family by substitution of strontium for barium allowing reduction of corrosion and excessive crystallization reactions.

The composition (C) belongs to the so-called LAS family: Lanthanum Alumino Silicate, formulated for its strong chemical durability.

The three families of glasses cited above all have both high TEC and low interactions.

In these three compositions (A), (B) or (C) one or several optional oxide(s) may optionally be used for, while retaining the whole of the advantageous properties already cited above, adapting the properties of the created gaskets, seals, and in particular reducing the glass transition temperature and enhancing the formation of the gasket. This (these) optional oxide(s) is(are) generally selected from ZnO, MnO, $B_2O_3$, $Cr_2O_3$, and $TiO_2$.

Preferably, the composition (A), the composition (B) or the composition (C) actually contain said optional oxide(s).

Advantageously, the composition (A) is selected from the compositions A1 to A12 shown in Table 1 below:

TABLE 1

| Molar % Mass % | SiO$_2$ | | Al$_2$O$_3$ | | CaO | | ZnO | | MnO$_2$ | | B$_2$O$_3$ | | Cr$_2$O$_3$ | | TiO$_2$ | |
|---|---|---|---|---|---|---|---|---|---|---|---|---|---|---|---|---|
| A1 (CAS) | 40.00 | 38.60 | 10.00 | 16.37 | 50.00 | 45.03 | | | | | | | | | | |
| A2 (CAS_Cr2) | 39.80 | 38.13 | 9.95 | 16.18 | 49.75 | 44.49 | | | | | | | 0.5 | 1.21 | | |
| A3 (CAS_Cr) | 39.60 | 37.68 | 9.90 | 15.98 | 49.50 | 43.96 | | | | | | | 0.99 | 2.38 | | |
| A4 (CAS_B) | 39.02 | 37.55 | 9.76 | 15.93 | 48.78 | 43.80 | | | | | 2.44 | 2.72 | | | | |
| A5 (CAS_B2) | 38.10 | 36.55 | 9.52 | 15.51 | 47.62 | 42.64 | | | | | 4.76 | 5.29 | | | | |
| A6 (CAS_Mn2) | 39.02 | 37.53 | 9.76 | 15.92 | 48.78 | 43.78 | | | 2.44 | 2.77 | | | | | | |
| A7 (CAS_Mn) | 38.10 | 36.52 | 9.52 | 15.49 | 47.62 | 42.60 | | | 4.76 | 5.39 | | | | | | |
| A8 (CAS_Mn3) | 36.36 | 34.65 | 9.09 | 14.70 | 45.45 | 40.42 | | | 9.09 | 10.23 | | | | | | |
| A9 (CAS_Mn_Cr) | 37.74 | 35.69 | 9.43 | 15.14 | 47.17 | 41.64 | | | 4.72 | 5.27 | | | 0.94 | 2.26 | | |
| A10 (CAS_Zn) | 38.10 | 36.23 | 9.52 | 15.37 | 47.62 | 42.27 | 4.76 | 6.14 | | | | | | | | |
| A11 (CAS2BT) | 41.46 | 38.71 | 11.76 | 18.62 | 39.48 | 34.40 | | | | | 5.09 | 5.51 | | | 2.22 | 2.75 |
| A12 (CAS2B) | 42.4 | 39.81 | 12.02 | 19.15 | 40.37 | 35.38 | | | | | 5.20 | 5.66 | | | | |

Advantageously, the composition (B) is selected from the compositions B1 to B10 shown in Table 2 below:

Advantageously, the assembly formed by the parts and the glass composition is maintained at a plateau at a temperature

TABLE 2

| Glass composition | $SiO_2$ % mol | $SiO_2$ % mass | $Al_2O_3$ % mol | $Al_2O_3$ % mass | CaO % mol | CaO % mass | SrO % mol | SrO % mass | ZnO % mol | ZnO % mass | $MnO_2$ % mol | $MnO_2$ % mass | $B_2O_3$ % mol | $B_2O_3$ % mass | $Cr_2O_3$ % mol | $Cr_2O_3$ % mass |
|---|---|---|---|---|---|---|---|---|---|---|---|---|---|---|---|---|
| B1 (SCAS) | 47.62 | 36.55 | 4.76 | 6.20 | 9.52 | 6.82 | 38.10 | 50.43 | | | | | | | | |
| B2 (SCAS-Cr2) | 47.39 | 36.21 | 4.74 | 6.15 | 9.48 | 6.76 | 37.91 | 49.96 | | | | | | | 0.47 | 0.92 |
| B3 (SCAS-Cr) | 47.17 | 35.89 | 4.72 | 6.09 | 9.43 | 6.70 | 37.74 | 49.51 | | | | | | | 0.94 | 1.82 |
| B4 (SCAS-B) | 46.51 | 35.79 | 4.65 | 6.07 | 9.30 | 6.68 | 37.21 | 49.38 | | | | | 2.33 | 2.07 | | |
| B5 (SCAS-B2) | 45.45 | 35.06 | 4.55 | 5.95 | 9.09 | 6.95 | 36.36 | 48.38 | | | | | 4.55 | 4.06 | | |
| B6 (SCAS-Mn2) | 46.51 | 35.78 | 4.65 | 6.07 | 9.3 | 6.68 | 37.21 | 49.36 | | | 2.33 | 2.11 | | | | |
| B7 (SCAS-Mn) | 45.45 | 35.04 | 4.55 | 5.95 | 9.09 | 6.54 | 36.36 | 48.34 | | | 4.55 | 4.14 | | | | |
| B8 (SCAS-Mn3) | 43.48 | 33.65 | 4.35 | 5.71 | 8.7 | 6.28 | 34.78 | 46.42 | | | 8.7 | 7.94 | | | | |
| B9 (SCAS-Mn—Cr) | 45.05 | 34.43 | 4.5 | 5.84 | 9.01 | 6.43 | 36.04 | 47.50 | | | 4.5 | 4.06 | | | 0.9 | 1.74 |
| B10 (SCAS-Zn) | 45.45 | 34.82 | 4.55 | 5.91 | 9.09 | 6.50 | 36.36 | 48.05 | 4.55 | 4.72 | | | | | | |

Advantageously, the composition (C) is selected from the compositions C1 to C7 shown in Table 3 below:

T2 from 600° C. to 1,000° C., notably from 700° C. to 950° C., for example from 800° C. to 900° C., more specifically

TABLE 3

| Glass composition | $SiO_2$ % mol | $SiO_2$ % mass | $Al_2O_3$ % mol | $Al_2O_3$ % mass | $La_2O_3$ % mol | $La_2O_3$ % mass | ZnO % mol | ZnO % mass | $MnO_2$ % mol | $MnO_2$ % mass | $B_2O_3$ % mol | $B_2O_3$ % mass | CaO % mol | CaO % mass | $Cr_2O_3$ % mol | $Cr_2O_3$ % mass |
|---|---|---|---|---|---|---|---|---|---|---|---|---|---|---|---|---|
| C1 (LAS) | 65.00 | 32.68 | 15.00 | 12.80 | 20.00 | 54.52 | | | | | | | | | | |
| C2 (LAS-Zn) | 61.90 | 31.60 | 14.29 | 12.38 | 19.05 | 52.73 | 4.76 | 3.29 | | | | | | | | |
| C3 (LAS-Mn) | 61.90 | 31.74 | 14.29 | 12.43 | 19.05 | 52.95 | | | 4.76 | 2.88 | | | | | | |
| C4 (LAS-B) | 63.41 | 32.21 | 14.63 | 12.61 | 19.51 | 53.74 | | | | | 2.44 | 1.44 | | | | |
| C5 (LAS-Ca) | 61.90 | 31.93 | 14.29 | 12.50 | 19.05 | 53.27 | | | | | | | 4.76 | 2.29 | | |
| C6 (LAS-Mn—Cr) | 61.32 | 31.35 | 14.15 | 12.28 | 18.87 | 52.31 | | | 4.72 | 2.85 | | | | | 0.94 | 1.22 |
| C7 (LAS-Cr) | 64.36 | 32.27 | 14.85 | 12.64 | 19.80 | 53.84 | | | | | | | | | 0.99 | 1.26 |

In Tables 1 to 3 above, the glass compositions A, B and C according to the invention are also designated by using a notation in which appears the name of the family to which the composition belongs i.e. CAS, SCAS or LAS optionally followed by mentioning the metal or the metals of the optional oxide(s) possibly included in the composition (for example Mn for MnO).

The glass composition according to the invention may be in the form of a powder, preferably a pre-sintered powder, or further as a solid (massive) block.

The invention further relates to a method for assembling at least two parts, wherein the following successive steps are performed:

a) the parts are put into contact with a glass composition as described in the foregoing;

b) the assembly formed by the parts and the glass composition is heated while observing a temperature ramp or several temperature ramps, optionally separated or interrupted by one or several temperature plateau(s), at a heating rate comprised between 0.5 and 3° C./min, up to a temperature T1 sufficient for softening the glass composition in order to form a gasket between the parts; and then the assembly is maintained at a sufficient temperature T2, less than or equal to T1, and for a sufficient duration so that the glass composition solidifies and comprises more than 50% by weight of crystalline phase and preferably comprises 100% by weight of crystalline phase;

c) the assembly formed by the parts and the gasket is cooled down to room temperature or to the operating temperature.

It should be noted that under operating conditions, the gasket is then completely or partly crystallized, is solid and forms a solid bond with the materials in contact.

from 800° C. to 850° C., for a duration of more than one hour, preferably from 50 hours to 720 hours, still preferably from 50 to 100 hours.

According to a first embodiment, the step for putting the parts in contact with the glass composition is carried out by forming a powder of the glass composition, this powder preferably having a grain size of less than 20 µm, by putting this powder in suspension in an organic binder so as to obtain a paste, slurry, and by coating at least one surface of the parts to be assembled with the obtained paste, slurry.

Advantageously, before reaching the temperature T1, a plateau may be observed at a temperature T3 for a sufficient duration in order to remove the organic binder, for example a plateau is observed at a temperature T3 from 300 to 500° C., for example 400° C., for a duration from 60 to 180 minutes, for example 240 minutes.

During step b), the following procedure may be carried out: rise at 0.5° C./minute from room temperature, plateau at 400° C. for 120 minutes, rise at 3° C./minute from 400° C.; plateau at 800-950° C. for 50 hours to 120 hours, descent at a rate of 3° C./minute down to room temperature or to the operating temperature.

According to a second embodiment, the step for putting the part in contact with the glass composition is carried out by preparing a glass part having the shape of the gasket to be formed and then by putting this part into place between the surfaces of the part to be assembled.

Advantageously, said glass part may be prepared by compacting and then sintering a powder of the glass composition in a mold matching the shape of the glass part.

Or else, said glass part may be a solid, massive glass block prepared by direct casting of the molten glass composition in a mold matching the shape of the glass part.

In this step, the gasket/joint will probably be again in the glassy form; crystallization only occurs upon applying the heat treatment.

Advantageously, the parts to be assembled may be made of a material selected from metals; metal alloys, ceramics; and composite materials comprising several of the aforementioned materials.

Advantageously, said at least two parts to be assembled may be made of different materials.

Advantageously, said at least two parts to be assembled may be part of a high temperature electrolyzer <<HTE>> or a high temperature fuel cell <<SOFC>>.

The invention further relates to a gasket obtained by the method described above.

The invention also relates to an assembly obtained by the method described in the foregoing.

Finally the invention relates to a high temperature electrolyzer or a high temperature fuel cell comprising such a gasket or such an assembly.

BRIEF DESCRIPTION OF THE DRAWINGS

The invention will be better understood upon reading the detailed description which follows, given as an illustration and not as a limitation in connection with the appended drawings, wherein.

DETAILED DESCRIPTION OF CERTAIN ILLUSTRATIVE EMBODIMENTS

Figure 1:
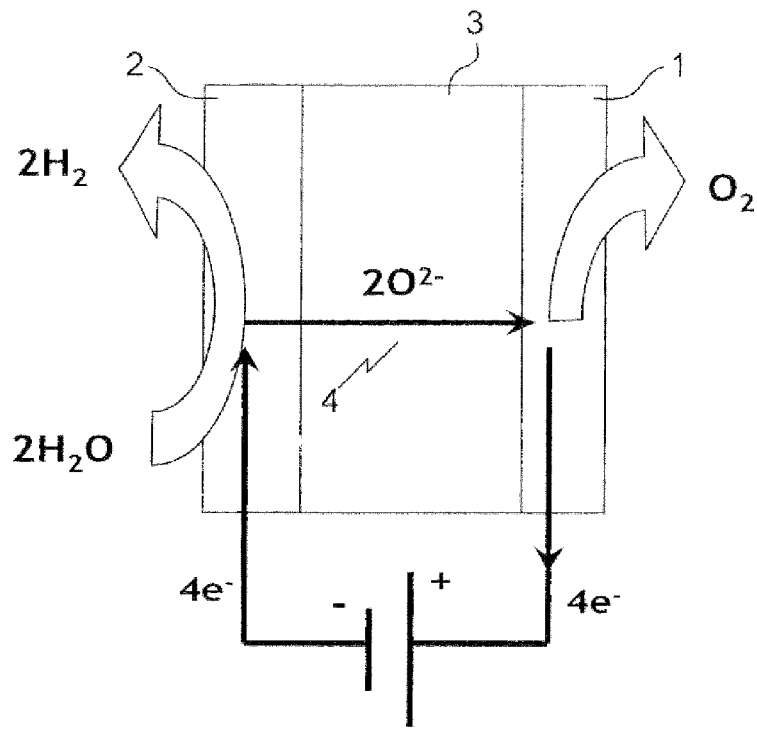
FIG. 1 is a schematic vertical sectional view of an elementary cell of a high temperature electrolyzer (HTE)
Figure 2:
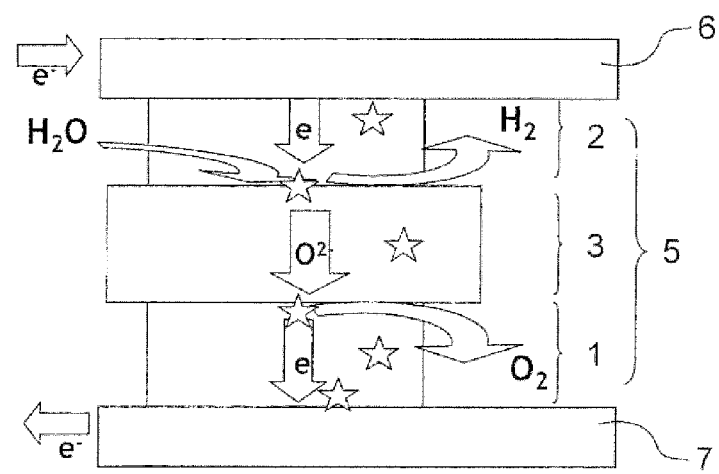
FIG. 2 is a schematic vertical sectional view of an elementary reactor or elementary module of a high temperature electrolyzer (HTE)
Figure 3:
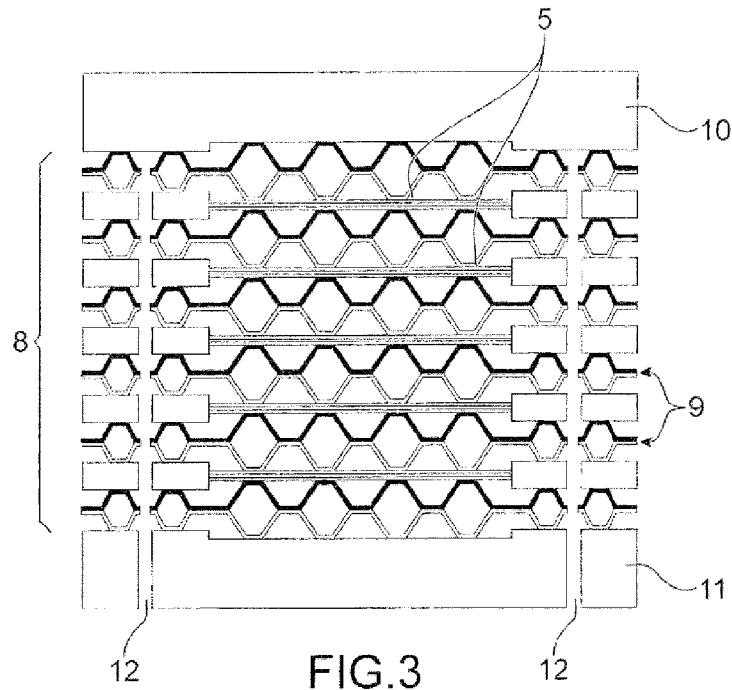
FIG. 3 is a schematic vertical sectional view of a conventional high temperature electrolyzer comprising a stack of elementary modules.
Figure 4:
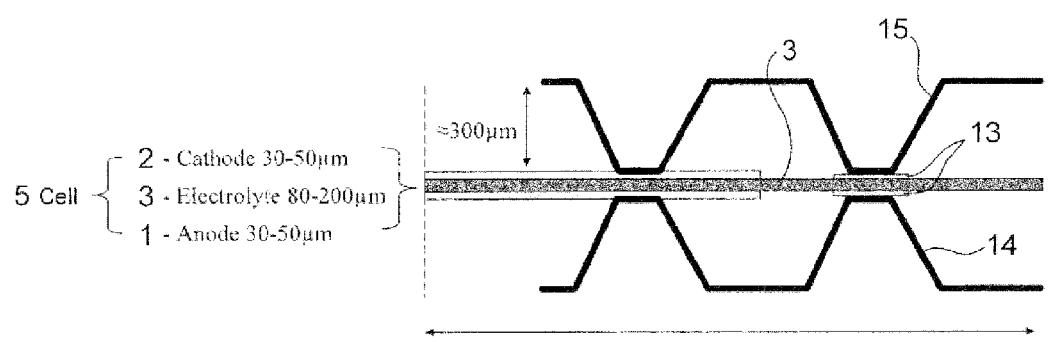
FIG. 4 is a schematic vertical sectional view of an elementary module of a conventional high temperature electrolyzer which shows the leakproof, sealed, gaskets, seals, between the cell and the lower and upper interconnectors.

The following detailed description is rather made for convenience in connection with the method according to the invention.

The first step of the method according to the invention first of all consists of preparing, elaborating a glass composition.

The glass composition according to the invention is either consisting of silica ($SiO_2$), alumina ($Al_2O_3$), and calcium oxide, and optionally of one or several oxide(s) selected from the following oxides: ZnO, $MnO_2$, $B_2O_3$, $Cr_2O_3$ and $TiO_2$ (Glass Composition A), or of silica ($SiO_2$), alumina ($Al_2O_3$), calcium oxide, and strontium oxide and optionally of one or several oxide(s) selected from the following oxides: ZnO, $MnO_2$, $B_2O_3$, and $Cr_2O_3$ (Glass Composition B); or of silica ($SiO_2$), alumina ($Al_2O_3$), and lanthanum oxide ($La_2O_3$) and optionally of one or several oxide(s) selected from the following oxides: ZnO, $MnO_2$, $B_2O_3$, CaO, and $Cr_2O_3$.

Preferably, the glass composition (A), the glass composition (B), or the glass composition (C) actually contain one or several of the aforementioned optional oxides.

The molar proportions and the preferred molar proportions of each of the constituents in these compositions (A), (B), and (C) and the molar proportions of each of the constituents, in the particular compositions A1 to A12, B1 to B10, and C1 to C7, have been mentioned above.

Of course, the sum of the molar percentages of the constituents of each of the compositions (A), (B) and (C) is equal to 100%.

The glass composition according to the invention according to a first embodiment is a powdery composition which may be prepared by synthesizing, first of all, from precursor compounds, materials of the different oxides of the glass of said composition, a glass containing these oxides.

By precursor compound, material of an oxide, is generally meant a compound or material which may be transformed into this oxide under the conditions for elaborating the glass, notably during melting.

This(these) precursor compound(s), material(s), of oxide(s) may consist of these pure oxides and/or of compounds consisting of several of these oxides, and/or of materials such as carbonates, the other materials which may be transformed into oxides under the conditions of elaboration of the glass, notably during melting.

In most cases, the precursor material of an oxide consists of this same pure oxide.

The oxides, precursor materials of these oxides and the references from suppliers of these materials are listed in Table 4 below.

TABLE 4

Raw materials for elaborations of glasses according to the invention.

| Oxide | Precursor Material | Supplier |
| --- | --- | --- |
| $Al_2O_3$ | $Al_2O_3$ | Prolabo ®- 20985-361 |
| $B_2O_3$ | $H_3BO_3$ | Prolabo ® - 20185-297 |
| BaO | BaO | |
| CaO | CaO | Cerac ® - C-1038 |
| $Cr_2O_3$ | $Cr_2O_3$ | Prolabo ® - 22798_298 |
| $La_2O_3$ | $La_2O_3$ | Prolabo ® - 24960-260 |
| MgO | MgO | Prolabo ® - 25061-293 |
| $MnO_2$ | $MnO_2$ | Prolabo ® - 25268-366 |
| PbO | PbO | |
| $SiO_2$ | $SiO_2$ | Millisil ® - E10 |
| SrO | $SrCO_3$ | |
| $V_2O_5$ | $V_2O_5$ | Prolabo ® - 20753-234 |
| $Y_2O_3$ | $Y_2O_3$ | RP - 0E294078 |
| ZnO | ZnO | Prolabo ® - 29211-298 |

These pure oxides, compounds consisting of several oxides, or precursor materials, compounds are generally in the form of powders.

First of all they are dried, for example in a muffle oven at 50° C.

Next, they are weighed while observing the intended proportions in the final glass composition which is desirably obtained, and they are then mixed and milled in any adequate device, such as a mortar.

Figure 5:
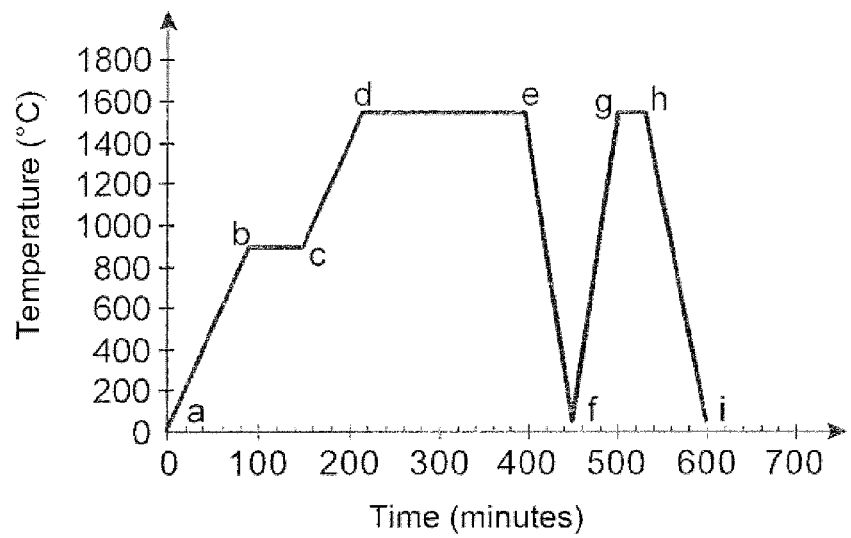
FIG. 5 is a graph which gives an example of a melting procedure for elaborating glasses according to the invention. The time t (in minutes) is plotted in abscissae, and the temperature T (in ° C.) is plotted in ordinates.

The mixture of milled powders is then introduced into a crucible, generally made of rhodium/platinum, and the different constituents of the mixture of powders are then melted while for example observing the following melting procedure, illustrated in FIG. 5, and comprising the following successive steps, for elaborating the glasses:

Step 1 (abc): rise in temperature from room temperature, at a rate of 5-15° C./min, for example 10° C.min$^{-1}$ (ab), up to a temperature of 850° C. to 950° C., for example 900° C., and then a plateau (bc) is observed at this temperature for 45 to 75 minutes, for example 1 hour.

This step is required for decarbonation of the carbonates, if carbonates are used in the starting mixture.

Otherwise, a direct rise in temperature is carried out for example at a rate of 0.5° C./min, from room temperature up to the plateau temperature (de).

Step 2 (cde): rise in temperature from the plateau temperature (bc) at a rate of 5 to 15° C./min, for example 10° C.min$^{-1}$, up to a temperature of 1,500 to 1,600° C., for example 1,550 (cd) and a plateau is then observed at this temperature for 100 to 200 minutes, for example 180 minutes (de).

With this step it is possible to bring the glass to its melting temperature and it is therefore possible to proceed with its elaboration.

Step 3 (ef): the molten glass is cast onto a metal plate in order to cool it rapidly, directly from a temperature of 1,500° C. to 1,600° C., for example 1,550° C. down to room temperature, and to solidify it. The cooling rate is generally estimated to be from 900° C./min to 1200° C./min, for example $10^3$° C./min. The obtained glass is then again milled and then remelted under the conditions of step 4 described below.

Step 4 (fgh): new rise in temperature, from room temperature at a rate from 5 to 15° C.min$^{-1}$, for example 10° C.min$^{-1}$, up to a temperature of 1,500 to 1,600° C., for example 1,550° C. (fg) and then a plateau is observed at this temperature for 20 to 40 minutes, for example 30 minutes (gh).

Step 5 (hi): in the same way as in step 3, the remelted glass is cast on a metal plate in order to cool it rapidly and to solidify it.

After cooling, a homogeneous glass is thereby obtained, for which the glass transition temperature generally varies between 730° C. and 850° C. depending on its composition.

It should be noted that the temperature of the plateau described above, for example of 1,500 to 1,550° C., is defined as being the elaboration temperature of the glasses.

The homogeneous glass obtained after cooling is recovered, and then milled in a mortar or any other adequate device in order to obtain a powder which is then sieved in order to obtain an adequate grain size, the grains of which have a size, for example a diameter from 5 to 250 μm, preferably from 10 to 100 μm, notably 20 μm, at least 20 μm.

The sieved powder is then conventionally mixed with a liquid organic cement or binder generally both viscous and tacky in order to obtain a glass paste a so-called <<slurry>> allowing it to be homogeneously spread over the surfaces of the substrates to be assembled, between which a seal leakproof gasket should be made.

In other words, the mixture of the glass and of the binder generally has the consistency of a malleable paste easy to distribute into the often narrow grooves where the gaskets have to be accommodated.

The binder generally comprises one or several dispersant compound(s) such as terpineol generally in an amount from 10 to 15% by mass based on the total mass of the paste, one or several binding compound(s) such as polyvinyl butyral (PVB) generally in an amount from 4 to 8% by mass based on the total mass of the paste, and one or several solvent(s) such as ethanol in an amount from 10 to 20% by mass based on the total mass of the paste.

A typical composition of the paste formed with the organic binder is given in Table 5 below.

TABLE 5

Composition of the paste used for the gasket shaping step.

| Components | Mass % | Role |
| --- | --- | --- |
| Terpineol | 12 | dispersant |
| PVB | 6 | binder |
| Absolute ethanol | 12 | solvent |
| Glass | 70 | base |

The suspension, paste of the glass composition described earlier, is spread out, coated, applied, preferably homogeneously over the surface of at least one of the parts to be assembled and then the surfaces of both parts to be assembled are put into contact. This brazing configuration is generally called a <<sandwich configuration>> since the paste of the brazing composition is directly placed between the surfaces of the parts to be assembled.

The amount of paste, suspension of brazing composition to be applied in this configuration is generally of the order of 0.1 to 0.4 cm$^3$ of paste per cm$^2$.

Or else, the surfaces of the part to be assembled are brought closer so as to leave an interval generally from 1 to 500 μm which will be filled by the capillarity effect with the brazing composition, the latter being positioned in proximity to the interval to be filled in a space or reservoir made for this purpose, said reservoir may have millimetric dimensions according to the knowledge of man skilled in the art in this field.

This brazing configuration is called a <<capillary configuration>>. With the brazing compositions according to the invention, it is possible to achieve such capillary brazing, i.e. an infiltration of the brazing composition into the brazing joint, without directly positioning the brazing composition between the part to be assembled like in the case of the <<sandwich configuration>>.

The amount of paste, suspension of brazing composition to be applied in this capillary configuration is generally of the same order as the one indicated above.

Other brazing configurations applying the brazing composition paste are of course possible.

Or else, the glass powder obtained as described above may be compacted and then sintered in a mold or preform for example made of graphite, with an adapted form matching the shape of the gasket which is desirably obtained. This mold or this preform may for example include a furrow or groove, the shape of which is that of the groove into which the gasket will have to be fitted. A sintered glass part is thereby obtained, which is removed from the mold and which is then placed between the parts to be assembled.

The glass composition according to the invention may appear no longer as a powder, but as a solid, massive block.

Let us specify that a powder generally consists of a discrete particles for which the dimension, for example the average diameter, may range from 5 μm to 250 μm while a solid, massive block generally has a size defined by its largest dimension from 1 to 50 cm.

It is possible to melt this solid, massive block and to cast the molten glass directly into a mold or preform for example made of graphite, with an adapted shape matching the shape of the joint which is desirably obtained. This mold or this preform may for example include a furrow or groove, the shape of which is that of the groove into which the gasket will be fitted. A glass part is thereby obtained in the form of a massive, solid, glass block which is removed from the mold and which is then placed between the parts to be assembled.

The second step of the method according to the invention generally consists of achieving the assembling, strictly speaking.

Prior to assembling, and generally prior to coating the surfaces to be assembled with a paste of the glass composition, or else prior to the placement of a sintered compacted glass or solid, massive glass part, both (or more) surfaces of the parts to be assembled are generally degreased in an organic solvent for example of the ketone, ester, ether, alcohol type, or a mixture thereof; and then dried.

The parts to be assembled are generally two in number, but it is also possible to simultaneously assemble a larger number of parts which may range up to 100.

According to the invention, it is possible to assemble parts of complex shape, geometry and/or of large size with excellent results every time.

The two or more parts to be assembled may be made of a same material, or else they may be in different materials. This is one of the advantages of the composition according to the invention in that it allows assembling of very different materials, notably materials for which the thermal expansion coefficients are very different.

The parts to be assembled may be made of a material selected from metal and metal alloys; Cermets; ceramics; and composite materials comprising several of the aforementioned materials.

Among metals and alloys, mention may be made of steels, such as steels with a high chromium content such as Crofer® or F18Tnb® from ArcelorMittal®; and nickel alloys such as nickel alloys with high chromium content, such as Haynes® 230.

Among the ceramics, mention may be made of ceramics of the <<YSZ>> (yttria-stabilized zirconia) type, or <<Macor>> type which is a machinable vitroceramic comprising $SiO_2$, $MgO$, $Al_2O_3$, $K_2O$, $B_2O_3$ and fluorine, or else further LSM (Lanthanum strontium manganite ($La_{1-x}Sr_x$-$Mn_y)_{3-\delta}$)).

Among Cermets, mention may be made of Ni Cermet.

The preferential application of the glass compositions according to the invention is the assembling of various constitutive elements of an <<EHT>> or of a <<SOFC>> and the materials which may be assembled with the method according to the invention applying the composition according to the invention will preferably be selected from materials which constitute the various elements of these apparatuses, devices.

Thus, the preferred materials for the <<EHT>> cathode (anode in the <<SOFC>> mode) and the <<EHT>> anode (cathode in the <<SOFC>> mode) respectively are, the nickel oxide-gadolinia doped ceria (NiO-CGO) Cermet and Lanthanum strontium manganite ($La_{1-x}Sr_xMn_yO_{3-\delta}$ or LSM), a preferred material for the electrolyte is LSM.

These are the materials which are most commonly used today industrially in the <<SOFC>> mode, but many other materials and combinations may be contemplated, such as the NiO-YSZ Cermet, nickelates ($La_4Ni_3O_{10}$, $La/Nd_2NiO_4$), chromo-manganites (LaCeSrCrMnO), ferrites ($La_{1-x}Sr_xFe_yO_{3-\delta}$), cobaltites ($La_{1-x}Sr_xCo_yO_{3-\delta}$) or titanates ($La_4Sr_{n-4}Ti_nO_{3n+2-\delta}$).

The compositions in mass percentages and the thermal expansion coefficients (TECs) of the metal materials Crofer®, F18TNb®, Haynes® 230, and of the YSZ and Macor® ceramics are given in Tables 6, 7 and 8 below:

TABLE 6

Properties and compositions of the materials put into contact with the gasket (*TEC from room temperature up to 800° C., ** TEC from room temperature up to 600° C., #TEC from room temperature up to 400° C., † indicates the maximum and ‡ indicates the complement).

| | Crofer ® | F18TNb ® | Haynes ® 230 | YSZ |
|---|---|---|---|---|
| Properties | | | | |
| $TEC_{mean}$ ($\times10^{-6}$ ° $C.^{-1}$)** | 11.4 | 12.1 | 14.1 | 9.6# |
| $TEC_{mean}$ ($\times10^{-6}$ ° $C.^{-1}$)* | 11.9 | 12.8 | 15.2 | |
| Composition (mass %) | | | | |
| Al | | 0.05 | 0.3 | |
| B | | | 0.015† | |
| C | 0.03 | 0.02 | 0.1 | |
| Co | | | 5† | |
| Cr | 20-24 | 17.8 | 22 | |
| Cu | 0.5 | | | |
| Fe | ca. 79‡ | ca. 80‡ | 3† | <0.01 |
| La | 0.04-0.2 | | 0.02 | |
| Si | 0.1 | 0.5 | 0.4 | |
| Mn | 0.3-0.8 | 0.5 | 0.5 | |
| Mo | | | 2 | |
| Ni | | | ca. 57‡ | |
| P | 0.05 | | | |
| S | 0.02 | | | |
| Ti | 0.03-0.2 | Ti + Nb 0.7 | | |
| W | | | 14 | |
| $ZrO_2$ | | | | 94.8 |
| $Y_2O_3$ | | | | 5.2 |
| $Na_2O$ | | | | <0.01 |

TABLE 7

Composition of Macor ® in mass % and estimation of the residual phase

| Macor ® | Composition |
|---|---|
| $SiO_2$ | 46 |
| $Al_2O_3$ | 16 |
| $B_2O_3$ | 7 |
| MgO | 17 |
| $K_2O$ | 10 |
| F | 4 |

TABLE 8

Properties of Macor ®

| Macor ® | From 25° C. to 600° C. | From 25° C. to 800° C. |
|---|---|---|
| $TEC_{mean}$ ($\times10^{-6}$ ° $C.^{-1}$) | 11.4 | 12.6 |

The parts ready to be assembled are positioned in a heating device such as an oven or subject to heating by any other adequate means.

The assembling may be carried out under an air atmosphere.

The parts to be assembled, the surfaces of which to be assembled have been provided with the glass composition, for example with the glass paste, are subjected, for example in the oven, to a thermal heating cycle, generally under an air atmosphere, or under an atmosphere of inert gas such as argon.

This cycle comprises as a fundamental step, a heat treatment consisting in a plateau, a thermal plateau, achieved at a temperature T2 generally from 800° C. to 950° C. which may be the maximum temperature T1 of the thermal cycle or a temperature below this maximum temperature T1, for a duration of generally 50 to 720 hours, for example 100 hours. This heat treatment at temperature T2 allows transformation of the glass compositions according to the invention, which are initially amorphous, into vitrocrystalline materials and thus formation of a solid bond, a solid joint, between the parts.

Thus, the assembly formed by the parts and the glass composition (paste, sintered compacted part or solid massive part) may be brought to the maximum temperature of the thermal cycle T1 where a thermal level or plateau may be observed, while observing a preferably <<slow>> rise in temperature, with one or several temperature ramp(s) from room temperature, this (these) ramp(s) being possibly interrupted and/or separated by one or several temperature plateau(s).

It is important to select the temperature raising rate so that no nucleation phenomenon occurs during the temperature rise phase, so as to avoid any crystallization phenomenon which would be detrimental to the formation of a gasket of good quality.

Indeed, crystallization occurs during the thermal level, plateau, at the temperature T2 which is less than or equal to the maximum temperature T1 of the cycle, for example at 800-950° C. as described above, and not during the rise in temperature.

This rise in temperature may be accomplished for example with one or several temperature ramp(s) each having a slope, for example of 0.5° C. per minute to 3° C. per minute, this(these) ramp(s), being possibly interrupted, separated by one or several temperature plateau(s).

Generally, one begins by carrying out a first plateau, level at a temperature from 300 to 500° C., for example 400° C. for a duration from 60 to 180 minutes, for example 120 minutes in order to remove the organic binder comprising a dispersant compound, a binding compound and a solvent compound, this operation for removing the organic solvent is generally called <<debinding>>.

The thermal <<crystallization>> plateau may be accomplished at a temperature T2 which is the maximum temperature T1 of the thermal cycle, after a rise in temperature at a rate of 0.5 to 3° C./minute or else this thermal plateau may be accomplished at a temperature T2 below the temperature T1 after having observed a temperature descent from T1 to T2.

This maximum temperature T1 is a temperature which is a temperature sufficient for forming the gasket with the interfaces i.e. the wetting of the molten glass composition on the surfaces of the materials constituting the parts to be assembled and optionally the crystallization of the glass.

According to the compositions, this temperature T1 may therefore vary, for example from 880° C. to 940° C., for example it may be 910° C.

Such a temperature for shaping, softening the compositions allows, according to another advantage of the method of the invention, the assembly to be used, notably in air, for example up to 800° C. and even up to 900° C.

At the end of the thermal cycle, following the plateau observed at temperature T2 which may be the maximum temperature T1 reached during this cycle or else a lower temperature, the assembly is cooled down to the temperature of use i.e. generally 700° C. to 900° C., for example at a rate of 0.5° C. to 3° C. per minute or else down to room temperature (20 to 25° C.) at a rate of 0.5° C. to 3° C./minute.

In the following, various methods for forming gaskets from a slurry preparation are then discussed.

The gasket is prepared from the milled glass powder, sieved for example to less than 20 μm. This powder is then mixed with an organic binder according to the proportions defined in Table 5 so as to produce a paste consistency which will be easy to place in the grooves dedicated to the assembling.

Figure 6:
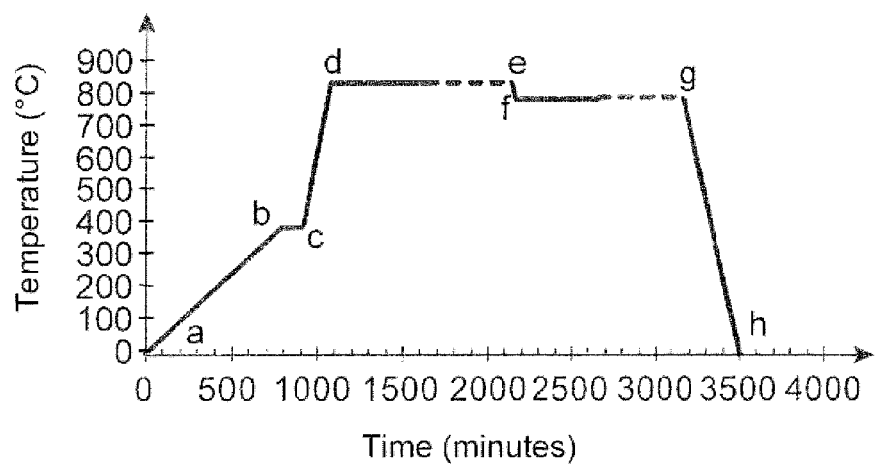
FIGS. 6, 7 and 8 are graphs which give examples of three heat treatment procedures for forming a solid gasket from a glass composition according to the invention. More specifically, these are three heat treatment procedures for setting into place and crystallizing gaskets prepared from slurries. The time t (in minutes) is plotted in abscissas and the temperature T (in ° C.) is plotted in ordinates.
Figure 7:
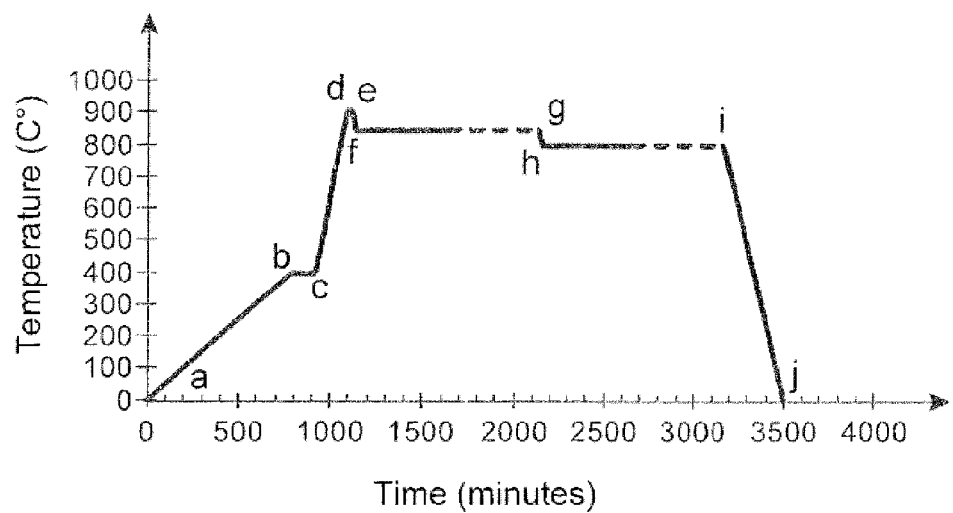
Figure 8:
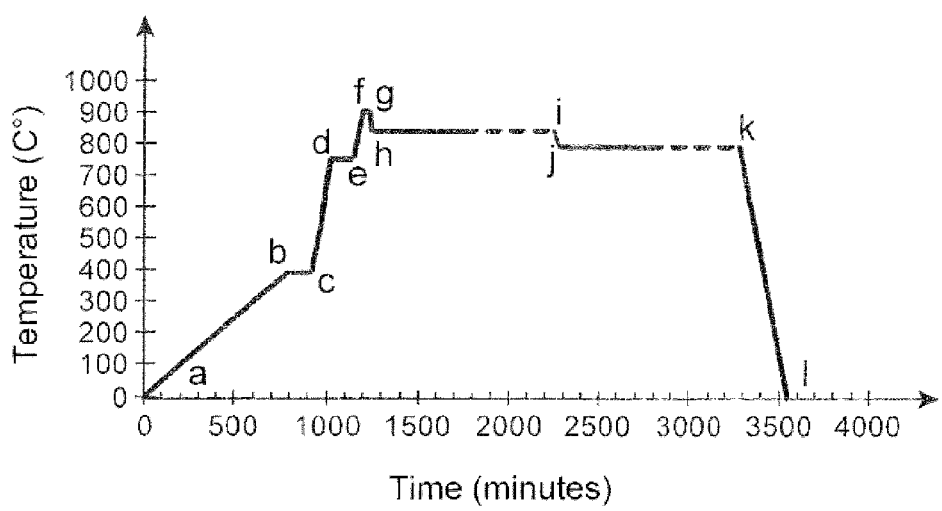

In order to form the solid gasket, different heat treatment procedures were investigated with plateaus at 800° C. and 950° C. for durations of 50, 100 and 720 hours (FIGS. 6, 7, and 8). Again, it is important to note that no nucleation phenomenon occurs during the temperature rise phase, so as to avoid any crystallization phenomenon which would be detrimental to the formation of a gasket of good quality.

A first heat treatment procedure for placement and crystallization of gaskets prepared from slurries is described in FIG. 6, this first procedure comprises the following successive steps:

Step 1 (abc): rise in temperature from room temperature, at a rate of 0.5° C.min$^{-1}$ (ab) up to a temperature located in the range from 350-450° C., for example 400° C., followed by a 2 hours plateau at this same temperature (bc).

This step is required for removing the organic phase from the glass paste.

Step 2 (cde): rise in temperature, at a rate of 3° C.min$^{-1}$ or 0.5° C.min$^{-1}$, from the plateau (bc) up to the temperature of 850° C. (cd) and then a 100 hours plateau at this temperature (de).

This step allows placement and crystallization.

Step 3 (efg): lowering the temperature from 850° C. down to 800° C., at a rate of 3° C.min$^{-1}$ (ef) and a 100 hours plateau at this temperature (fg).

Next, optionally lowering the temperature down to room temperature (gh).

With this step it is possible to bring the glass to its operating temperature in the cell in order to stabilize it at this temperature.

It was then sought to define a treatment with which the quality of the glass deposit on the substrate may be optimized. The placement temperature was therefore increased and a second heat treatment procedure for placement and crystallization of gaskets prepared from slurries was developed. This second procedure is described in FIG. 7, and it comprises the following successive steps:

Step 1 (abc): rise in temperature at a rate of 0.5° C.min$^{-1}$ (ab) up to a temperature located in the range 350-450° C., for example 400° C., followed by a plateau for 1 hour to 3 hours, for example 2 hours at the same temperature (bc).

This step is required for removing the organic phase from the glass paste.

Step 2 (cde): rise in temperature, at a rate of 3° C.min$^{-1}$ or 0.5° C.min$^{-1}$, from the temperature of the plateau (bc), up to a temperature located in the range from 880° C. to 940° C., for example 910° C. (cd), and then a plateau for 20 mins to 1 hour, for example for 20 minutes at this temperature (de).

This step conditions the placement of the gasket.

Step 3 (efg): lowering the temperature from 910° C. to 850° C., at a rate of 3° C.min$^{-1}$ (ef) and plateau at this latter temperature for 50 to 100 hours, for example for 50 hours (fg).

This step is the crystallization treatment.

Step 4 (ghi): lowering the temperature at a rate of 3° C.min$^{-1}$, down to 800° C. (gh), and plateau at this latter temperature for a duration of 100 hours to 1000 hours, for example for 100 hours (hi). This step allows the glass to be brought to its operating temperature in the cell in order to stabilize it at this temperature.

Next, optionally, lowering of the temperature down to room temperature (ij).

The treatment according to the second procedure allows better control of the crystallization in the glasses. Indeed, maintaining a temperature close to (but greater than) the Tg of the glass is the ideal treatment for optimum nucleation. However, this treatment must not increase the viscosity which hinders good deposition of the glass at 910° C.

A third heat treatment procedure for placement and crystallization of gaskets prepared from slurries is described in FIG. 8, this third procedure comprises the following successive steps:

Step 1 (abc): rise in temperature at a rate of 0.5° C.min$^{-1}$ from room temperature up to a temperature located in the range 350-450° C., for example 400° C. (ab), followed by a 2 hours plateau at this same temperature (bc).

This step is required for removing the organic phase from the glass paste, like the treatment of Step 1 of the first procedure.

Step 2 (cde): rise in temperature (cd), at a rate of 3° C.min$^{-1}$ or 0.5° C.min$^{-1}$, up to a temperature located in the range of 730-850° C., for example 760° C., followed by a 2 hours plateau at this temperature (de).

Step 3 (efg): rise in temperature (ef) at a rate of 3° C.min$^{-1}$ or 0.5° C.min$^{-1}$, up to a temperature located in the range of 880 to 940° C., for example 910° C., and then a plateau at this temperature for 20 mins (fg).

This step is equivalent to Step 2 of the treatment according to the first procedure.

Step 4 (ghi): lowering of the temperature from 910° C. to 850° C., at a rate of 3° C.min$^{-1}$ or 0.5° C.min$^{-1}$ (gh) and a plateau for 50-100 hours, for example 50 hours at this temperature (hi). This step is the crystallization treatment.

Step 5 (ijk): temperature lowering at a rate of 3° C.min$^{-1}$, down to 800° C. (ij) followed by a plateau for 100 to 1,000 hours (jk) at this temperature. With this step it is possible to bring the glass to its operating temperature in the cell in order to stabilize it at this temperature.

Next, optionally, lowering the temperature down to room temperature (kl).

Another procedure for shaping the joint in solid form is also tested by sintering of the compacted glass powder in preforms so as to elaborate a solid object (of the bar type, with characteristic dimensions of a length from 100 to 150 mm, of a width from 2 to 4 mm and of a height from 1 to 2 mm, or of the ring type with an internal diameter from 15 to 25 mm and with a thickness from 1 to 2 mm.

The heat treatment applied, once the powder is placed in the mold, is the following:

- a rise in temperature at a rate of 0.5° C.min$^{-1}$ up to a temperature comprised between 730° C. and 850° C. (according to the glass composition);
- maintaining this temperature for a duration from 30 minutes to 2 hours;
- cooling at a rate of 3° C.min$^{-1}$ down to room temperature.

The assemblies of parts including gaskets prepared by the method according to the invention allow the making of structures, apparatuses, components of complex shapes having high temperatures of use which may generally range up to 900° C. with great accuracy.

In other words, the method according to the invention may notably be applied to the manufacturing of any device, apparatus, structure, component, requiring assembling between at least two substrates, parts while both guaranteeing good mechanical strength and satisfactory seal, tightness at the assembly.

These devices, apparatuses, structures, components may meet needs in different fields but the preferred field to which is applied the invention, is that of high temperature electrolyzers and fuel cells.

The invention will now be described by means of the following examples of course given as an illustration and not as a limitation.

EXAMPLES

Example 1

In this example, glasses according to the invention are prepared by the elaboration method described above and the main physical properties of these glasses are determined.

These properties are:

- the amorphous or crystalline nature of the glass as determined by X-ray diffraction (XRD);
- the density MV (in g/cm$^3$) determined by a hydrostatic buoyancy method;
- the glass transition temperature Tg (° C.) determined by differential thermal analysis (DTA) and by dilatometry;
- the crystallization temperature Tx (° C.) determined by differential thermal analysis (DTA);
- the softening temperature Td (° C.) and the thermal expansion coefficient (TEC) determined by dilatometry.

Glasses Compositions (A), CAS Glasses

The main properties of these glasses are gathered in Table 9 below.

All these glasses may be elaborated at a temperature of less than 1,550° C. and are of a perfectly amorphous nature.

TABLE 9

Main properties of CAS glasses

| Glass | Elaboration temperature | XRD | MV | DTA $T_g$ (° C.) | DTA $T_x$ (° C.) | $T_x - T_g$ | Dilatometry $T_g$ (° C.) | Dilatometry $T_d$ (° C.) | TEC* ($10^{-6°}$ C.$^{-1}$) |
|---|---|---|---|---|---|---|---|---|---|
| CAS | 1500° C. | Amorphous | 2.90 | 789 | 1063 | 274 | 782 | | 9.94 |
| CAS-B | 1500° C. | Amorphous | 2.88 | 763 | 1035 | 272 | 741 | | 9.96 |
| CAS-B2 | 1500° C. | Amorphous | 2.83 | 731 | 1028 | 297 | 708 | 744 | 9.67 |
| CAS-Mn2 | 1500° C. | Amorphous | | 783 | 1067 | 284 | 766 | 804 | 10.01 |
| CAS-Mn | 1500° C. | Amorphous | 2.95 | 774 | 1040 | 266 | 761 | | 10.02 |
| CAS-Mn3 | 1450° C. | Amorphous | | 756 | 922/999 | 166 | | | |
| CAS-Cr2 | 1500° C. | Amorphous | | 790 | 1085 | 295 | 781 | 817 | 9.35 |
| CAS-Cr | 1500° C. | Amorphous | 2.91 | 795 | 1025/1058 | 230 | 784 | 821 | 9.98 |
| CAS-Zn | 1500° C. | Amorphous | 2.97 | 752 | 988/1058 | 236 | 748 | | 9.57 |
| CAS-Mn—Cr | 1500° C. | Amorphous | 2.95 | | | | 756 | 791 | 9.32 |

Glasses Compositions (B), SCAS Glasses

The main properties of these glasses are gathered in Table 10 below.

All these glasses may be elaborated at a temperature of less than 1,550° C. and are of a perfectly amorphous nature.

TABLE 10

Main properties of SCAS glasses

| Glass | Elaboration Temperature | XRD | MV | DTA $T_g$ | DTA $T_x$ | $T_x - T_g$ | Dilatometry $T_g$ | Dilatometry $T_d$ | TEC* |
|---|---|---|---|---|---|---|---|---|---|
| SCAS | 1550° C. | Amorphous | 3.51 | 772 | 996/1042 | 224 | 738 | 786 | 10.95 |
| SCAS-B | 1500° C. | Amorphous | 3.47 | 746 | 954/988 | 208 | 702 | 747 | 11.40 |
| SCAS-B2 | 1450° C. | Amorphous | | 723 | 922/969 | 199 | 680 | 718 | 11.77 |
| SCAS-Mn2 | 1500° C. | Amorphous | 3.53 | 770 | 999/1021 | 229 | 727 | 767 | 11.58 |
| SCAS-Mn | 1500° C. | Amorphous | 3.55 | 762 | 1086 | 324 | 727 | 770 | 11.66 |
| SCAS-Mn3 | 1450° C. | Amorphous | | | | | | | |

TABLE 10-continued

Main properties of SCAS glasses

| Glass | Elaboration Temperature | XRD | MV | DTA $T_g$ | $T_x$ | $T_x - T_g$ | Dilatometry $T_g$ | $T_d$ | TEC* |
|---|---|---|---|---|---|---|---|---|---|
| SCAS-Cr2 | 1500° C. | Amorphous | 3.51 | | | | | | |
| SCAS-Cr | 1500° C. | Amorphous | 3.52 | 785 | 999/1056 | 214 | 733 | 788 | 10.88 |
| SCAS-Zn | 1550° C. | Amorphous | 3.58 | | | | | | |
| SCAS-Mn—Cr | 1500° C. | Amorphous | 3.57 | | | | 732 | 792 | 11.59 |

Glasses Compositions (C), LAS Glasses

The main major properties of these glasses are gathered in Table 11 below.

All these glasses had to be elaborated at a temperature of 1,550° C., and are of a perfectly amorphous nature.

TABLE 11

Main properties of LAS glasses

| Glass | Elaboration Temperature | XRD | Specific Gravity | DTA $T_g$ | $T_x$ | Dilatometry $T_g$ | $T_d$ | CTE |
|---|---|---|---|---|---|---|---|---|
| LAS | 1550° C. | Amorphous | 3.96 | | | 845 | 877 | 6.65 |
| LAS-B | 1550° C. | Amorphous | 3.91 | | | | | |
| LAS-Mn | 1550° C. | Amorphous | 4.00 | | | | | |
| LAS-Cr | 1550° C. | Amorphous | 3.81 | | | | | |
| LAS-Zn | 1550° C. | Amorphous | 4.00 | | | | | |
| LAS-Mn—Cr | 1550° C. | Amorphous | 3.86 | | | | | |

Example 2

In this example, the characteristics of the gaskets formed with the glass compositions according to the invention are studied.

This study consists of determining the quality of the interfaces and the nature of the formed crystalline phases.

Quality of the Interfaces

The interactions of glass compositions according to the invention with various materials making up an electrolyzer are studied at various operating temperatures, i.e. 800 to 900° C., and for various durations, i.e. 50 to 720 hours, under an oxidizing atmosphere (air).

These tests are conducted in the laboratory with samples of materials representative of the electrolyzer, on which is placed a small amount of glass paste applied in the same way as for the tests on electrolyzer prototypes. The glass/metal and glass/ceramic samples are treated in air in a muffle oven according to the heat treatment procedure of FIG. 6.

The interface is then observed with a scanning electron microscope (SEM).

Glasses of the CAS and SCAS Families

For glasses of the CAS and SCAS families, the best characteristics of the gaskets in terms of contact and interface quality with the different substrates are obtained after a treatment at 850° C. for a duration of at least 50 hours, according to the procedure described in FIG. 6.

Figure 9:
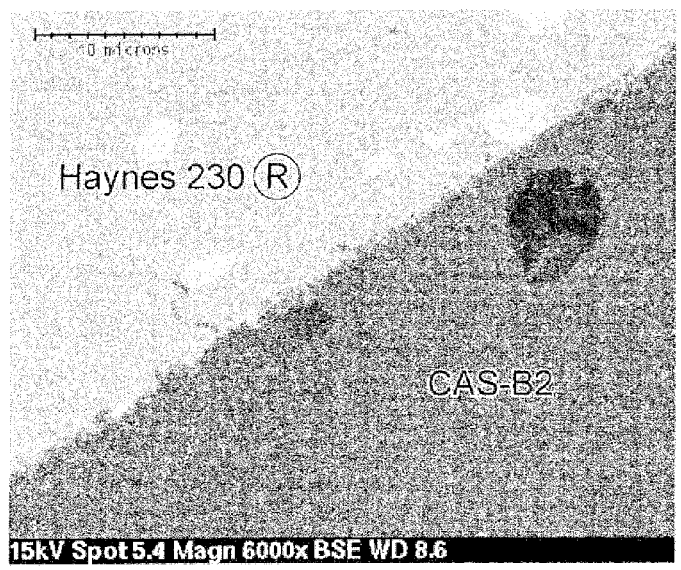
FIG. 9 is a photograph taken with a scanning electron microscope (SEM) of the interface between a gasket formed from the glass composition according to the invention designated as <<CAS-B2>> and a polished surface of a substrate made of Haynes® 230 alloy, after a heat treatment at 850° C. for 50 hours and under an air atmosphere. The scale in the upper left of the figure represents 10 μm.
Figure 10:
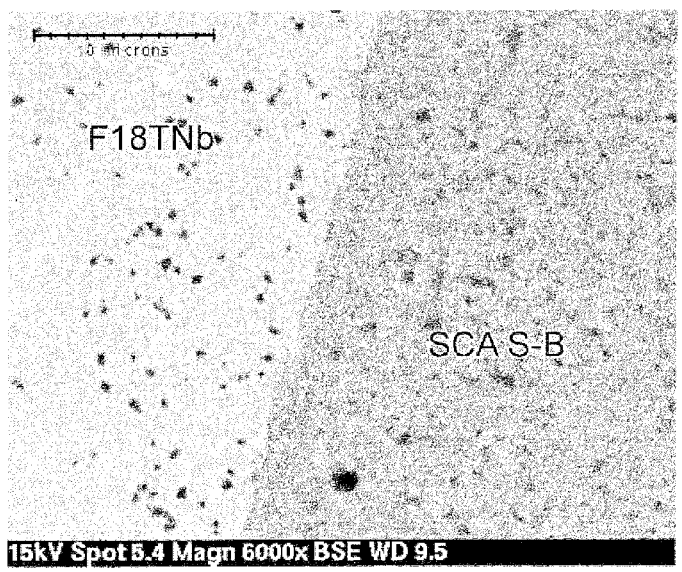
FIG. 10 is a photograph taken with a scanning electron microscope (SEM) of the interface between a gasket formed from the glass composition according to the invention designated as <<SCAS-B>> and a polished surface of a substrate made of F18TNb® alloy after a heat treatment at 850° C. for 50 hours and under an air atmosphere. The scale in the upper left of the figure represents 10 μm.
Figure 11:
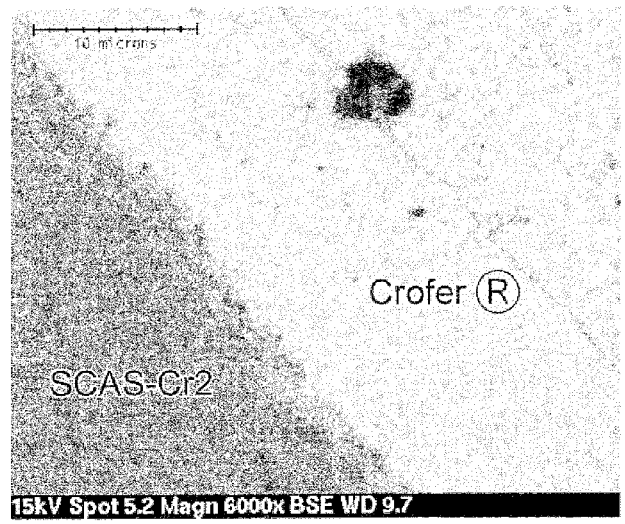
FIG. 11 is a photograph taken with a scanning electron microscope (SEM) of the interface between a gasket formed from the glass composition according to the invention designated as <<SCAS-Cr2>> and a polished surface of a substrate made of Crofer® after a heat treatment at 850° C. for 50 hours and under an air atmosphere. The scale in the upper left of the figure represents 10 μm.

At the interface with the metals, the best adhesion qualities are obtained with metal surfaces polished beforehand, as this is apparent from FIGS. 9, 10 and 11 which are photographs taken with the SEM of the interface between the CAS-B2 glass and a polished surface of a substrate made of Haynes® 230 alloy (FIG. 9), of the interface between the SCAS-B glass and a polished surface made of a F18Tnb® alloy from Arcelor Mittal® (FIG. 10) and of the interface between the SCAS_Cr2 glass and a polished surface of a substrate made of Crofer® (FIG. 11), respectively.

In FIGS. 9, 10 and 11, the heat treatment was carried out at 850° C. for a duration of 50 hours.

Figure 12:
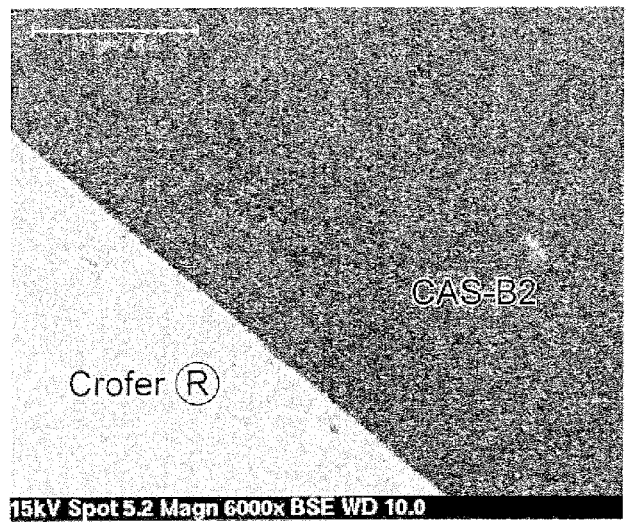
FIG. 12 is a photograph taken with a scanning electron microscope (SEM) of the interface between a gasket formed from the glass composition according to the invention designated as <<CAS-B2>> and a polished surface of a substrate made of Crofer® after heat treatment at 850° C. for 720 hours and under an air atmosphere. The scale in the upper left of the figure represents 10 μm.

For all the glass compositions, a chromium oxide layer with a thickness of the order of 1-2 μm is observed at the interface. An exception is seen for the composition CAS-B2 for which no interstitial phase is observed after treatment at 850° C. for 720 hours, as this may be seen in FIG. 12 which is a photograph taken with the SEM of the interface between the CAS-B2 glass and a polished surface of a substrate made of Crofer®.

Figure 13:
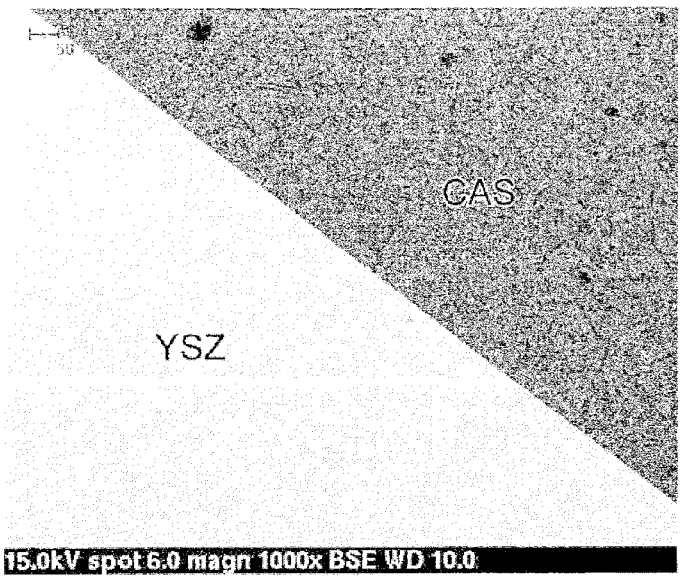
FIG. 13 is a photograph taken with a scanning electron microscope (SEM) of the interface between a gasket formed from the glass composition according to the invention designated as <<CAS>> and a surface of a substrate made of YSZ after a heat treatment at 850° C. for 50 hours and under an air atmosphere. The scale in the upper left of the figure represents 50 μm.

The interface between the gaskets and the YSZ ceramic is always of good quality; no new interfacial phase is formed and no major interdiffusion is observed as this may be observed in FIG. 13 which is a photograph taken with the SEM of the interface between the CAS glass and a surface of a substrate made of YSZ ceramic.

Figure 14:
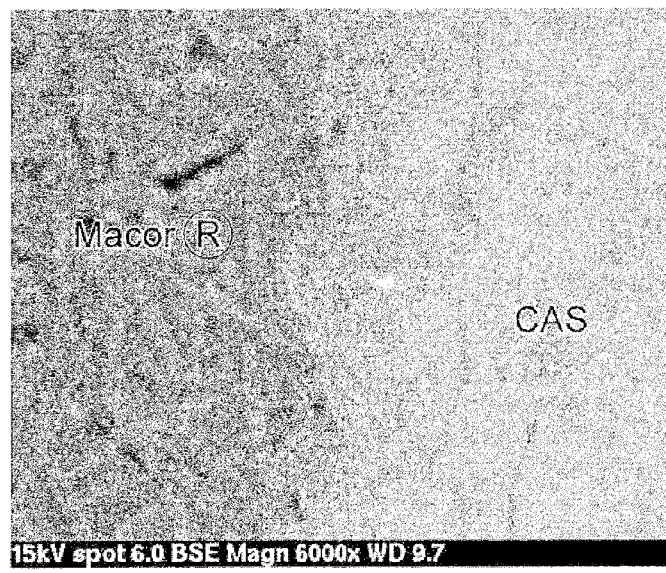
FIG. 14 is a photograph taken with the scanning electron microscope (SEM) of the interface between the gasket formed from the glass composition according to the invention designated as <<CAS>> and a surface of a substrate made of Macor® after heat treatment at 850° C. for 50 hours and under an air atmosphere. The scale in the upper left of the figure represents 5 μm.

Upon contact with Macor®, adhesion is good, but there is formation of an interfacial layer rich in $Al_2-O_3$, as this may be observed in FIG. 14 which is a photograph taken with the SEM of the interface between the CAS glass and a surface of a substrate made of Macor®.

For FIGS. 13 and 14, the heat treatment was carried out at 850° C. for 50 hours.

Glasses of the LAS Family.

For glasses of the LAS family, because of their high glass transition temperatures (Tg), the best gasket quality is obtained after a treatment at 950° C. for at least 50 hours. The gasket is then entirely crystallized.

Figure 15:
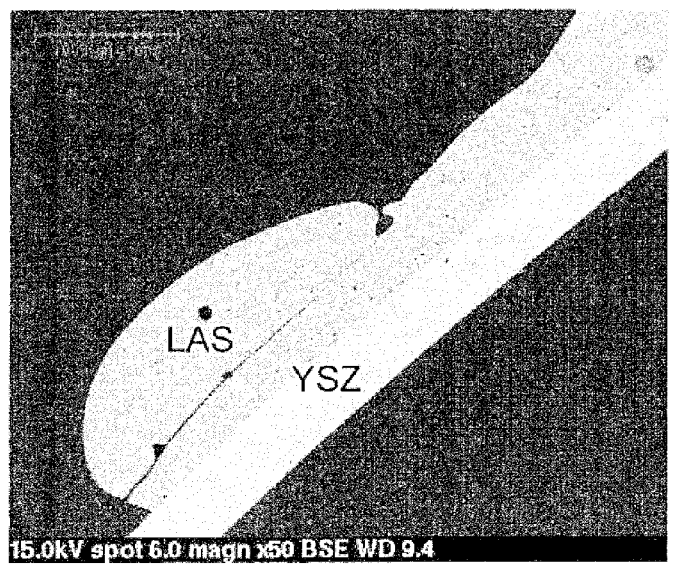
FIG. 15 is a photograph taken with a scanning electron microscope (SEM) of the interface between a gasket formed from the glass composition according to the invention designated as <<LAS>> and a surface of a substrate made of YSZ alloy after heat treatment at 950° C. for 50 hours and under an air atmosphere. The scale in the upper left of the figure represents 1000 μm.
Figure 16:
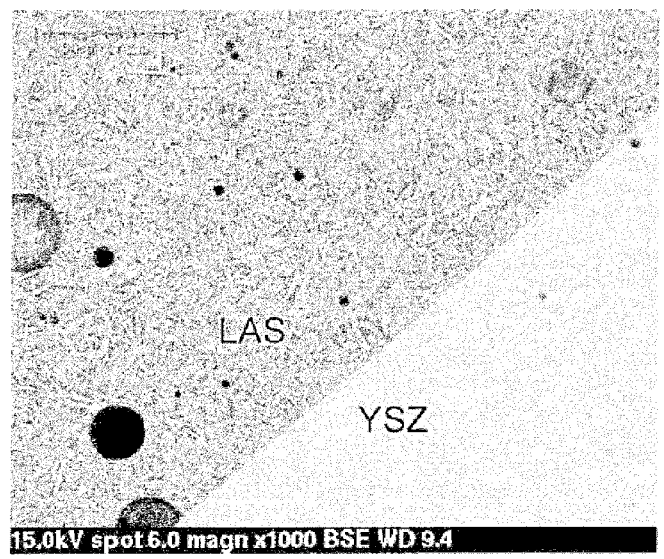
FIG. 16 is a photograph taken with a scanning electron microscope (SEM) of the interface between a gasket formed from the glass composition according to the invention designated as <<LAS>> and a surface of a substrate made of YSZ alloy after heat treatment at 950° C. for 50 hours and under an air atmosphere. The scale in the upper left of the figure represents 50 μm.

The interfaces with the materials are good, although cracks in the bulk are visible as this appears in FIGS. 15 and 16 which are photographs taken with the SEM of the interface between the LAS glass and a surface of a YSZ substrate, respectively.

For FIGS. 15 and 16, the heat treatment was carried out at 950° C. for 50 hours.

Nature of the Formed Crystalline Phases

The nature of the phases formed during crystallization depends on the duration of the treatment, on the temperature and on the chemical composition of the initial glass.

After the heat treatment for shaping the gasket, the latter is in a totally crystallized condition or in a partly crystallized condition (crystalline) where the crystallized phase represents more than 50% of the mass of the gasket, seal.

Some of the phases present in the treated gaskets have been identified and are listed in the following Tables 12, 13 and 14.

In Tables 12, 13 and 14, the following notations are used:
- <<x>> indicates that the measurements were not conducted;
- <<amp>> indicates that the glass is amorphous;
- <<$U_n$>> for example $U_6$, indicates an unidentified crystalline phase bearing the number n, and $U_{nmajor}$ or $U_{nminor}$ indicate that this crystallized phase $U_n$ is a majority, respectively a minority;
- The 4 figure number indicated in the Tables 12, 13 and 14 for designating the materials making up the formed crystalline phases, for example 0302, 0755, correspond to the key of the code of the JCPDS material data sheet of these materials, given in Table 15 below.

TABLE 12

Crystalline phases formed versus the duration and temperature of the heat treatment for CAS glasses.

| | Heat Treatment | | | | |
|---|---|---|---|---|---|
| | 800° C. | | 850° C. | | 950° C. |
| Glass | 50 h. | 100 h. | 100 h. | 720 h. | 100 h. |
| CAS | x | amp | 0302/$U_{3minor}$ | 0755$_{minor}$/$U_{1major}$ | 0755/$U_{6minor}$ |
| CAS-B | x | amp | 0088/$U_{1major}$ | x | x |
| CAS-B2 | x | x | 0088/0369/0755 | 0088/0369/0755 | x |
| CAS-Mn | amp | amp | 0755/$U_{1minor}$ | x | x |
| CAS-Mn2 | x | x | x | 0755$_{minor}$/$U_{1major}$ | x |
| CAS-Mn3 | x | x | x | x | x |
| CAS-Cr2 | x | x | x | 0755/$U_{6major}$ | x |
| CAS-Cr | x | x | $U_6$/$U_1$ | x | x |
| CAS-Zn | x | 0755 | x | x | x |
| CAS-Mn—Cr | x | 0755 | 0755/0865/$U_{6minor}$ | 0755/0865/$U_{6minor}$ | x |

TABLE 13

Crystalline phases formed with the time and temperature for the SCAS glasses.

| | Heat treatment | | | |
|---|---|---|---|---|
| | 800° C. | | 850° C. | |
| Glass | 50 h. | 100 h. | 100 h. | 720 h. |
| SCAS | x | 1257/$U_?$ | 0099/1257/$U_{4minor}$ | 0099/1257 |
| SCAS-B | x | 0099/1257/$U_?$ | 0099/$U_{4minor}$ | 0099/$U_4$ |
| SCAS-B2 | x | x | x | x |
| SCAS-Mn | x | 1275/$U_?$ | 1257/$U_{5minor}$ | 1275/$U_{5minor}$ |
| SCAS-Mn2 | x | x | x | 0099/$U_{5minor}$ |
| SCAS-Mn3 | x | x | x | x |
| SCAS-Cr2 | x | x | 1257 | 0099/$U_{5minor}$ |
| SCAS-Cr | x | 0099/1257 | 1257 | x |
| SCAS-Zn | x | x | $U_{2minor}$ | x |
| SCAS-Mn—Cr | x | x | 0099/1257/$U_{5minor}$ | x |

TABLE 14

Crystalline phases formed with the time and temperature for LAS glasses.

| | Heat Treatment | | |
|---|---|---|---|
| | 800° C. | | 950° C. |
| Glass | 50 h. | 100 h. | 100 h. |
| LAS | x | amp | 2456/$U_{7minor}$ |
| LAS-B | x | amp | 2456/$U_{7minor}$ |
| LAS-Mn | x | amp | 2456/$U_{7minor}$ |
| LAS-Cr | x | x | X |
| LAS-Zn | x | amp | $U_7$ |
| LAS-Mn—Cr | x | x | x |
| LAS-Ca | x | amp | x |

TABLE 15

JCPDS keys and codes of the observed materials.

| Key | Name | Chemical formula | Code |
|---|---|---|---|
| 0302 | Larnite, syn | $Ca_2SiO_4$ | 00-033-0302 |
| 0755 | Gehlenite, syn | $Ca_2Al_2SiO_7$ | 00-035-0755 |
| 1257 | Strontium silicate | $SrSiO_3$ | 00-032-1257 |
| 0099 | Strontium silicate | $SrSiO_3$ | 00-034-0099 |
| 2456 | Lanthanum silicate | $La_2Si_2O_7$ | 01-072-2456 |
| 0865 | Calcium manganese aluminium silicate | $Ca_{2.43}Mn_{1.29}Al_{1.28}(SiO_4)_3$ | 01-078-0865 |
| 0369 | Calcium silicate | $Ca_2SiO_4$ | 00-029-0369 |
| 0088 | Wollastonite-2M | $CaSiO_3$ | 00-027-0088 |

The compositions of the residual glassy phases were estimated from the composition of the initial glasses by assuming that the crystallization process was complete and the crystallized phases were known.

The extrapolated and approximated compositions (in molar %) of the residual glassy phases in the gaskets prepared with the glass compositions CAS, SCAS and LAS after heat treatment at a temperature of 850° C. for 50 hours, are given in Tables 16, 17 and 18 below respectively.

The majority of the residual glassy phases are of high durability, except perhaps for phases rich in $B_2O_3$ and $MnO_2$ which will be more viscous and therefore less long-lasting.

TABLE 16

Extrapolated and approximate compositions (in molar %) of the residual glassy phases in CAS gaskets after heat treatment

| Composition | Crystalline phase | $SiO_2$ | $Al_2O_3$ | CaO | ZnO | $MnO_2$ | $B_2O_3$ | $Cr_2O_3$ |
|---|---|---|---|---|---|---|---|---|
| CAS | 0302 | 60.0% | 40.0% | | | | | |
|  | 0755 | 50.0% | | 50.0% | | | | |
| CAS-Cr2 | 0755 | 49.6% | | 49.6% | | | | 0.8% |
| CAS-Cr | 0755 | 49.2% | | 49.2% | | | | 1.6% |
| CAS-B | 0088 | | 44.4% | 44.4% | | | 11.1% | |
| CAS-B2 | 0088 | | 40.0% | 40.0% | | | 20.0% | |
|  | 0369 | | 50.0% | 33.3% | | | 16.7% | |
|  | 0755 | 46.2% | | 46.2% | | | 7.7% | |
| CAS-Mn2 | 0755 | 48.0% | | 48.0% | | 4.0% | | |
| CAS-Mn | 0755 | 46.2% | | 46.2% | | 7.7% | | |
| CAS-Mn3 | 0755 | 42.9% | | 42.9% | | 14.3% | | |
| CAS-Mn—Cr | 0755 | 45.5% | | 45.5% | | 7.6% | | 1.5% |
|  | 0865 | 33.3% | 9.5% | 55.6% | | 0% | | 1.6% |
| CAS-Zn | 0755 | 43.8% | | 50.0% | 6.2% | | | |

TABLE 17

Extrapolated and approximate compositions (in molar %) of the residual glassy phases in SCAS gaskets after heat treatment

| Composition | Phase | $SiO_2$ | $Al_2O_3$ | CaO | ZnO | $MnO_2$ | $B_2O_3$ | $Cr_2O_3$ |
|---|---|---|---|---|---|---|---|---|
| SCAS | 1257/0099 | 40.0% | 20.0% | 40.0% | | | | |
| SCAS-Cr2 | 1257/0099 | 39.2% | 19.6% | 39.2% | | | | 1.9% |
| SCAS-Cr | 1257/0099 | 38.5% | 19.2% | 38.5% | | | | 3.8% |
| SCAS-B | 1257/0099 | 36.4% | 18.2% | 36.4% | | | 9.1% | |
| SCAS-B2 | 1257/0099 | 33.3% | 16.7% | 33.3% | | | 16.7% | |
| SCAS-Mn2 | 1257/0099 | 36.4% | 18.2% | 36.4% | | 9.1% | | |
| SCAS-Mn | 1257/0099 | 33.3% | 16.7% | 33.3% | | 16.7% | | |
| SCAS-Mn3 | 1257/0099 | 28.6% | 14.3% | 28.6% | | 28.6% | | |
| SCAS-Mn—Cr | 1257/0099 | 32.3% | 16.1% | 32.3% | | 16.1% | | 3.2% |
| SCAS-Zn | 1257/0099 | 33.3% | 16.7% | 33.3% | 16.7% | | | |

TABLE 18

Extrapolated and approximated compositions (in molar %) of residual glassy phases in LAS gaskets after heat treatment.

| Composition Phase | $SiO_2$ | $Al_2O_3$ | $La_2O_3$ |
|---|---|---|---|
| LAS | 2456 | 45.0% | 15.0% |

Example 3

In this example, sealing, tightness tests are carried out by measuring the pressure drop on vitroceramic gaskets prepared with the glass composition <<CAS-B2>> according to the invention.

Preparation of the Gasket.

A conventional shaping method is used for the glass gasket which consists of preparing a glass paste or slurry consisting of a mixture of the glass milled to a grain size from 0 to 20 μm, of terpineol, polyvinyl butyral and ethanol.

The mass proportions used for making this mixture are 12% of terpineol which plays the role of a dispersant, 6% of polyvinyl butyral which plays the role of a binder, 12% of ethanol which plays the role of a solvent and 70% of glass powder. The obtained mixture has the consistency of a maleable paste, easy to spread out.

Sealing and Pressurization Assembly

Figure 17:
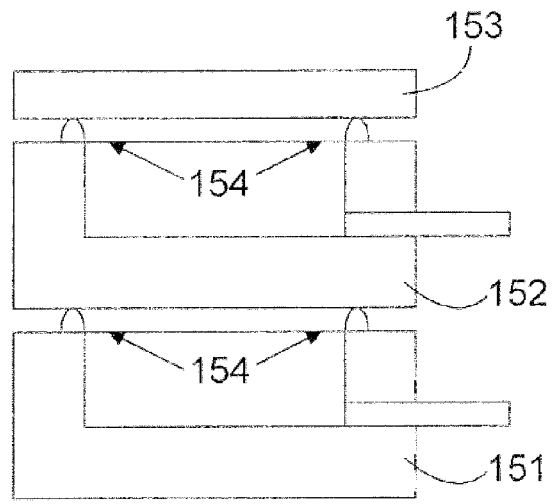
FIG. 17 is a schematic vertical sectional view of the pressurizing assembly for carrying out sealing tests with gaskets prepared with the glass compositions according to the invention, before loading and heat treatment.
Figure 18:
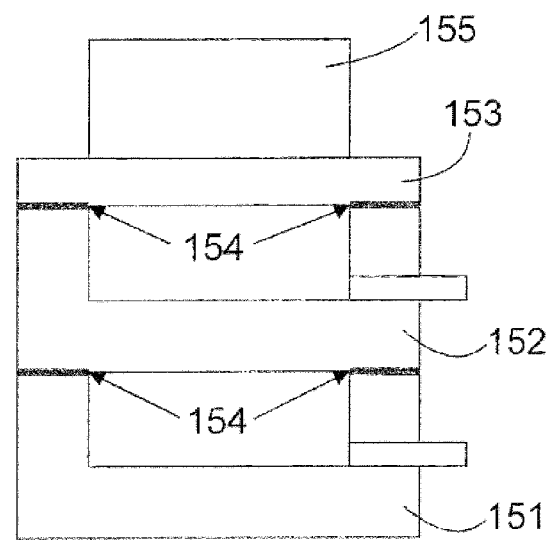
FIG. 18 is a schematic vertical sectional view of the pressurizing assembly for carrying out sealing tests with gaskets prepared with the glass compositions according to the invention, after loading and heat treatment.

The test assembly used for the sealing, tightness, and pressurization tests is schematized in FIGS. 17 and 18.

FIG. 17 illustrates the assembly before loading and heat treatment while FIG. 18 illustrates the assembly after loading and heat treatment.

The test assembly essentially consists of 3 portions:
- a first plate made of Inconel® XC 750 (TEC: about 15.7 $10^{-6}$ $K^{-1}$) (151);
- a second plate made of Inconel® XC 750 (152) placed on the first plate (151);
- a zirconia disc or sole (153) simulating the cell;
- a gravity load.

In order to conduct a sealing test, the vitroceramic gasket slurry (154) prepared as described above, is deposited between the first plate (151) and the second plate (152) made of Inconel® XC 750 and between the second plate (152) made of Inconel® XC 750 and the zirconia sole (153). The test is accomplished at 800° C. with a gravity load of 38 kilos (155) applied under cold conditions.

The assembly of FIG. 17 is integrated into a pressurization circuit fed with a helium circuit comprising adjustment, purging and isolation valves, and a sensor.

Placement of the Slurry

The gasket slurry is manually deposited as beads (154) by means of a syringe on the plate made of Inconel® XL 750 over a diameter of about 50 μm.

The zirconia sole (153) is then deposited on the bead and the gravity load of 38 kg (155) is added (FIG. 18) and the whole is then positioned in a NABERTHERM® L120/12 No. 177144-oven at 1,200° C. with the tubing passing in the lower portion of the guillotine door.

Conducting the Test and Results

The seal tests are conducted at 800° C.; they consist of measuring the pressure drop which occurs over time in the proposed assembly. The gas that is used is helium which is put under excess pressure in the assembly with 50 mbar steps. It is proceeded, stepwise with three series of tests at 80 mbars, 100 mbars and 150 mbars.

The thermal cycle applied to the assembly is the following:

raising the temperature at a rate of 0.5° C./min up to 400° C.;
 a temperature plateau at 400° C. for 120 mins in order to achieve debinding of the organic components;
 raising the temperature at a rate of 3° C./min up to 850° C.; temperature maintained for 100 hours at 850° C.;
 lowering the temperature down to 800° C. (test temperature) at a rate of 0.5° C./min;
 maintaining the temperature (800° C.) during the whole duration of the test.

The leak rate is defined by the following relationship:

$$Q = \frac{\Delta P * V}{t}$$

wherein:

Q represents the leak rate in mbar·L·s$^{-1}$;

V represents the relevant volume in L.

ΔP represents the pressure drop in mbars;

t represents the time in seconds.

Three series of tests were conducted at 80, 100 and 150 mbars.

Figure 19:
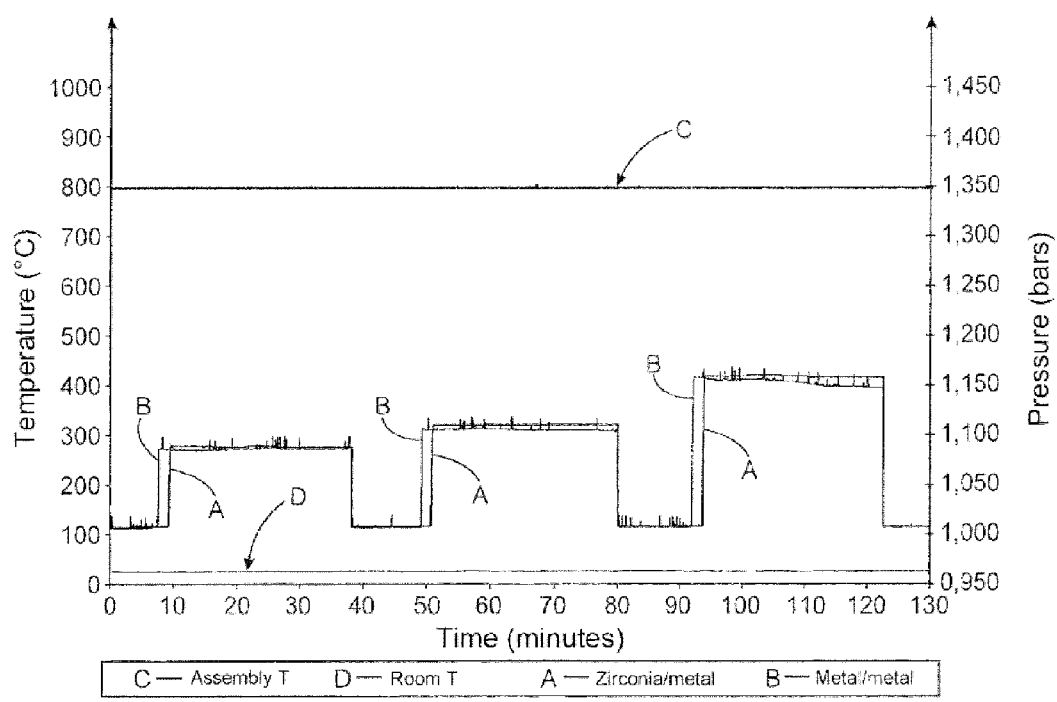
FIG. 19 is a graph which illustrates the pressure drop measurements carried out during the sealing tests of vitroceramics, carried out in Example 3 at 80, 100, 150 mbars. The time (in minutes) is plotted in abscissas and the temperature (on the left in ° C.) and the pressure (on the right in bars) are plotted in ordinates. Curve A represents the pressure (in bars) at the zirconia/metal interface, curve B illustrates the pressure (in bars) at the metal/metal interface, the lines C and D respectively illustrate the temperature of the assembly (in ° C.) and the room temperature (in ° C.).

The graph of FIG. 19 shows the whole of the conducted measurements.

These preliminary seal tests show good performances of the vitroceramic gasket at both metal/metal and metal/ceramic interfaces.

During these three tests, return to atmospheric pressure is accomplished after opening isolation valves of the assembly. The results of the tests are shown in Tables 19 and 20 hereafter.

Table 19 accounts for the sealing, tightness at the zirconia/metal interface and Table 20 relates to the metal/metal interface.

TABLE 19

Sealing Test-Zirconia/Metal-800° C.

| No. | Test Temp. ° C. | Set Delta P mbar | ΔP mbar | Duration s | Q mbar · l/s |
|---|---|---|---|---|---|
| 1 | 799 | 80 | 1 | 1740 | 2.09E−04 |
| 2 | 799 | 100 | 1 | 1740 | 2.09E−04 |
| 3 | 799 | 150 | 1 | 1740 | 2.09E−04 |

TABLE 20

Sealing Test-Metal/Metal-800° C.

| No. | Test Temp. ° C. | Set Delta P mbar | ΔP mbar | Duration s | Q mbar · l/s |
|---|---|---|---|---|---|
| 1 | 799 | 80 | 1 | 1800 | 2.02E−04 |
| 2 | 799 | 100 | 1 | 1800 | 2.02E−04 |
| 3 | 799 | 150 | 10 | 1800 | 2.02E−03 |

Tables 19 and 20 Show the Results of Sealing Tests of a Vitroceramic Gasket

The measurement of the leak rates undoubtedly reveals the efficiency of the gaskets.

It is therefore noted that the results obtained with gaskets according to the invention are very good and meet the seal criterion required in certain <<EVHT>> architectures.

Further, tests carried out over longer durations (300 hours) have shown:

at the metal/metal interface, gradual return to atmospheric pressure after 300 hours, which demonstrates an average leak rate of 2.10$^{-4}$ mbar·l·s$^{-1}$ of helium with an initial pressure of 200 mbar at 800° C.,
 at the zirconia/metal interface, stabilization of the pressure difference around 130 mbars and this over these 300 hours.

REFERENCES

[1] Zheng R. et al., Journal of Power Sources, 128 (2004), 165-172.

[2] Eichler K. et al., Journal of the European Ceramic Society, 19 (1999), 1101-1104.

[3] Loehman R. et al., Brow R. "*Engineered Glass Composites for Sealing Solid Oxide Fuel Cells*" SECA Core Technology Program Review, May 11-13, 2004 Boston, USA.

[4] U.S. Pat. No. 4,921,738.

[5] WO-A1-96/05626.

[6] U.S. Pat. No. 6,430,966-B1.

[7] U.S. Pat. No. 6,532,769-B1

[8] Meinhardt K D et al., Journal of Power Sources, 182, (2008), 188-196

[9] Ley K L et al., Journal of Material Research, 11 (6), (1996),1489-1496

[10] Geasee P, Thesis, Berlin, (2003), ISBN 3-8325-0301-3

[11] Lahl et al., journal of Material Science, 35, (2000), 3089-3096

[12] Bahadur D et al., Journal of the Electrochemical Society, 151 (4), (2004), A558-A562

[13] Flügel A et al., Journal of the Electrochemical Society, 154 (6), (2007), A601-A608

[14] Pascual et al., Journal of Power Sources, 169, (2007), 40-46

[15] US-A1-2008/0090715

[16] WO-A2-2007/120546

[17] WO-A1-99/54131

[18] WO-A1-2006/069753

[19] U.S. Pat. No. 6,828,263-B2

What is claimed is:

1. A vitroceramic glass composition, wherein the composition is selected from the group consisting of:

a glass composition (A) consisting of in molar percentages:
- 36 to 43% of $SiO_2$;
- 9 to 13% of $Al_2O_3$;
- 38 to 50% of CaO; and of one or several oxide(s) selected from the group consisting of the following oxides in the following molar percentages:
- 4 to 5% of ZnO;
- 2 to 9% of $MnO_2$;
- 2 to 6% of $B_2O_3$;
- 0.1 to 1% of $Cr_2O_3$;
- 0.1 to 4% of $TiO_2$;

a glass composition (B) comprising molar percentages of:
- 43 to 48% of $SiO_2$;
- 4 to 5% of $Al_2O_3$;
- 8 to 10% of CaO;
- 34 to 39% of SrO; and optionally of one or several oxide(s) selected from the group consisting of the following oxides in the following molar percentages:
- 4 to 5% of ZnO;
- 2 to 9% of $MnO_2$;
- 2 to 5% of $B_2O_3$;
- 0.1 to 1% of $Cr_2O_3$; and a glass composition (C) comprising molar percentages of:
- 61 to 65% of $SiO_2$;
- 14 to 15% of $Al_2O_3$;
- 18 to 20% of $La_2O_3$; and optionally of one or several oxide(s) selected from the following oxides in the following molar percentages:
- 4 to 5% of ZnO;
- 4 to 5% of $MnO_2$;
- 2 to 3% of $B_2O_3$;
- 4 to 5% of CaO
- 0.1 to 1% of $Cr_2O_3$;

wherein the glass composition comprises more than 50% by weight of Crystalline phase, obtained by maintaining the glass composition at a temperature plateau from 600° C. to 1,000° C., for a duration of more than 1 hour said temperature plateau being reached by observing one or several temperature rise ramps at a rate from 0.5 to 3° C./minute.

2. The glass composition according to claim 1, which at the end of its elaboration and before any heat treatment only consists of an amorphous glassy phase.

3. The composition according to claim 1, wherein the composition (A) is selected from the group consisting of compositions A1 to A12 shown in the table below:

| | $SiO_2$ | | $Al_2O_3$ | | CaO | | ZnO | | $MnO_2$ | | $B_2O_3$ | | $Cr_2O_3$ | | $TiO_2$ | |
|---|---|---|---|---|---|---|---|---|---|---|---|---|---|---|---|---|
| Molar % Mass % | mol | mass | mol | mass | mol | mass | mol | mass | mol | mass | mol | mass | mol | mass | mol | mass |
| A1 (CAS) | 40.00 | 38.60 | 10.00 | 16.37 | 50.00 | 45.03 | | | | | | | | | | |
| A2 (CAS_Cr2) | 39.80 | 38.13 | 9.95 | 16.18 | 49.75 | 44.49 | | | | | | | 0.5 | 1.21 | | |
| A3 (CAS_Cr) | 39.60 | 37.68 | 9.90 | 15.98 | 49.50 | 43.96 | | | | | | | 0.99 | 2.38 | | |
| A4 (CAS_B) | 39.02 | 37.55 | 9.76 | 15.93 | 48.78 | 43.80 | | | | | 2.44 | 2.72 | | | | |
| A5 (CAS_B2) | 38.10 | 36.55 | 9.52 | 15.51 | 47.62 | 42.64 | | | | | 4.76 | 5.29 | | | | |
| A6 (CAS_Mn2) | 39.02 | 37.53 | 9.76 | 15.92 | 48.78 | 43.78 | | | 2.44 | 2.77 | | | | | | |
| A7 (CAS_Mn) | 38.10 | 36.52 | 9.52 | 15.49 | 47.62 | 42.60 | | | 4.76 | 5.39 | | | | | | |
| A8 (CAS_Mn3) | 36.36 | 34.65 | 9.09 | 14.70 | 45.45 | 40.42 | | | 9.09 | 10.23 | | | | | | |
| A9 (CAS_Mn_Cr) | 37.74 | 35.69 | 9.43 | 15.14 | 47.17 | 41.64 | | | 4.72 | 5.27 | | | 0.94 | 2.26 | | |
| A10 (CAS_Zn) | 38.10 | 36.23 | 9.52 | 15.37 | 47.62 | 42.27 | 4.76 | 6.14 | | | | | | | | |
| A11 (CAS2BT) | 41.46 | 38.71 | 11.76 | 18.62 | 39.48 | 34.40 | | | | | 5.09 | 5.51 | | | 2.22 | 2.75 |
| A12 (CAS2B) | 42.4 | 39.81 | 12.02 | 19.15 | 40.37 | 35.38 | | | | | 5.20 | 5.66 | | | | |

4. The composition according to claim 1, wherein the composition (B) is selected from the group consisting of compositions B1 to B10 shown in the table below:

| | $SiO_2$ | | $Al_2O_3$ | | CaO | | SrO | | ZnO | | $MnO_2$ | | $B_2O_3$ | | $Cr_2O_3$ | |
|---|---|---|---|---|---|---|---|---|---|---|---|---|---|---|---|---|
| Glass composition | % mol | % mass | % mol | % mass | % mol | % mass | % mol | % mass | % mol | % mass | % mol | % mass | % mol | % mass | % mol | % mass |
| B1 (SCAS) | 47.62 | 36.55 | 4.76 | 6.20 | 9.52 | 6.82 | 38.10 | 50.43 | | | | | | | | |
| B2 (SCAS-Cr2) | 47.39 | 36.21 | 4.74 | 6.15 | 9.48 | 6.76 | 37.91 | 49.96 | | | | | | | 0.47 | 0.92 |
| B3 (SCAS-Cr) | 47.17 | 35.89 | 4.72 | 6.09 | 9.43 | 6.70 | 37.74 | 49.51 | | | | | | | 0.94 | 1.82 |
| B4 (SCAS-B) | 46.51 | 35.79 | 4.65 | 6.07 | 9.30 | 6.68 | 37.21 | 49.38 | | | | | 2.33 | 2.07 | | |
| B5 (SCAS-B2) | 45.45 | 35.06 | 4.55 | 5.95 | 9.09 | 6.95 | 36.36 | 48.38 | | | | | 4.55 | 4.06 | | |
| B6 (SCAS-Mn2) | 46.51 | 35.78 | 4.65 | 6.07 | 9.3 | 6.68 | 37.21 | 49.36 | | | 2.33 | 2.11 | | | | |
| B7 (SCAS-Mn) | 45.45 | 35.04 | 4.55 | 5.95 | 9.09 | 6.54 | 36.36 | 48.34 | | | 4.55 | 4.14 | | | | |
| B8 (SCAS-Mn3) | 43.48 | 33.65 | 4.35 | 5.71 | 8.7 | 6.28 | 34.78 | 46.42 | | | 8.7 | 7.94 | | | | |
| B9 (SCAS-Mn—Cr) | 45.05 | 34.43 | 4.5 | 5.84 | 9.01 | 6.43 | 36.04 | 47.50 | | | 4.5 | 4.06 | | | 0.9 | 1.74 |
| B10 (SCAS-Zn) | 45.45 | 34.82 | 4.55 | 5.91 | 9.09 | 6.50 | 36.36 | 48.05 | 4.55 | 4.72 | | | | | | |

5. The composition according to claim 1, wherein the composition (C) is selected from the group consisting of compositions C1 to C7 shown in the table below:

| Glass composition | $SiO_2$ % mol | $SiO_2$ % mass | $Al_2O_3$ % mol | $Al_2O_3$ % mass | $La_2O_3$ % mol | $La_2O_3$ % mass | ZnO % mol | ZnO % mass | $MnO_2$ % mol | $MnO_2$ % mass | $B_2O_3$ % mol | $B_2O_3$ % mass | CaO % mol | CaO % mass | $Cr_2O_3$ % mol | $Cr_2O_3$ % mass |
|---|---|---|---|---|---|---|---|---|---|---|---|---|---|---|---|---|
| C1 (LAS) | 65.00 | 32.68 | 15.00 | 12.80 | 20.00 | 54.52 | | | | | | | | | | |
| C2 (LAS-Zn) | 61.90 | 31.60 | 14.29 | 12.38 | 19.05 | 52.73 | 4.76 | 3.29 | | | | | | | | |
| C3 (LAS-Mn) | 61.90 | 31.74 | 14.29 | 12.43 | 19.05 | 52.95 | | | 4.76 | 2.88 | | | | | | |
| C4 (LAS-B) | 63.41 | 32.21 | 14.63 | 12.61 | 19.51 | 53.74 | | | | | 2.44 | 1.44 | | | | |
| C5 (LAS-Ca) | 61.90 | 31.93 | 14.29 | 12.50 | 19.05 | 53.27 | | | | | | | 4.76 | 2.29 | | |
| C6 (LAS-Mn—Cr) | 61.32 | 31.35 | 14.15 | 12.28 | 18.87 | 52.31 | | | 4.72 | 2.85 | | | | | 0.94 | 1.22 |
| C7 (LAS-Cr) | 64.36 | 32.27 | 14.85 | 12.64 | 19.80 | 53.84 | | | | | | | | | 0.99 | 1.26 |

6. The glass composition according to claim 1, wherein the composition is in form of a powder.

7. A method for assembling at least two parts comprising the following successive steps:
   a) putting the parts into contact with a glass composition according to claim 1, thereby forming a first assembly comprising the parts and the glass composition;
   b) heating the assembly at a heating rate ranging between 0.5 and 3° C./min, said heating being optionally separated or interrupted by one or several temperature plateau(s), up to a temperature T1 sufficient for softening the glass composition in order to form a gasket between the parts; maintaining the assembly at a sufficient temperature T2, less than or equal to T1, and for a sufficient duration so that the glass composition solidifies and comprises more than 50% by weight of crystalline phase so as to form a second assembly comprising the parts and the gasket;
   c) cooling down the second assembly comprising the parts and the gasket to room temperature or an operating temperature.

8. The method according to claim 7, wherein the first assembly formed by the parts and the glass composition is maintained at a plateau at a temperature T2 from 600° C. to a 1,000° C. for a duration of more than 1 hour.

9. The method according to claim 7, wherein the step of putting the parts into contact with the glass composition comprises:
   forming a powder of the glass composition;
   suspending this powder in an organic binder so as to obtain a paste; and
   coating at least one surface of the parts to be assembled with the obtained paste.

10. The method according to claim 9, wherein before reaching the temperature T1, a plateau is observed at a sufficient temperature T3 for a sufficient duration for removing the organic binder.

11. The method according to claim 10, wherein during step b), the following procedure is carried out: raising the temperature at 0.5° C./minute from room temperature, plateau at 400° C. for 120 minutes, raising the temperature at 3° C./minute from 400° C.; plateau at 800-950° C. for 50 hours to 120 hours, lowering the temperature at a rate of 3° C./minute down to room temperature or down to an operating temperature.

12. The method according to claim 7, wherein the step of putting the parts into contact with the glass composition comprises preparing a glass part having a shape of the gasket to be formed and then setting this part into place between surfaces of the parts to be assembled.

13. The method according to claim 12, wherein said glass part is prepared by compacting and then sintering a powder of the glass composition in a mold matching the shape of the glass part.

14. The method according to claim 12, wherein said glass part is a solid, massive glass block prepared by direct casting of the molten glass composition into a mold matching the shape of the glass part.

15. The method according to claim 7, wherein the parts to be assembled comprise a material selected from the group consisting of metals, metal alloys, ceramics, and composite materials comprising several of the aforementioned materials.

16. The method according to claim 15, wherein said at least two parts to be assembled comprise different materials.

17. The method according to claim 7, wherein said at least two parts to be assembled are parts of a high temperature electrolyzer <<HTE>> or of a high temperature fuel cell <<SOFC>>.

18. A gasket obtained by the method according to claim 7.

19. An assembly obtained by the method according to claim 7.

20. A high temperature electrolyzer or high temperature fuel cell comprising a gasket according to claim 18.

21. A vitroceramic glass composition, wherein the composition is selected from the group consisting of:
   a glass composition (A) consisting of in molar percentages:
      36 to 43% of $SiO_2$;
      9 to 13% of $Al_2O_3$;
      38 to 50% of CaO; and of one or several oxide(s) selected from the group consisting of the following oxides in the following molar percentages:
      4 to 5% of ZnO;
      2 to 9% of $MnO_2$;
      2 to 6% of $B_2O_3$;
      0.1 to 1% of $Cr_2O_3$,
      0.1 to 4% of $TiO_2$;
   a glass composition (B) consisting of in molar percentages of:
      43 to 48% of $SiO_2$;
      4 to 5% of $Al_2O_3$;
      8 to 10% of CaO;
      34 to 39% of SrO; and optionally of one or several oxide(s) selected from the group consisting of the following oxides in the following molar percentages:
      4 to 5% of ZnO;
      2 to 9% of $MnO_2$;
      2 to 5% of $B_2O_3$;
      0.1 to 1% of $Cr_2O_3$; and a glass composition (C) consisting of in molar percentages of:

61 to 65% of $SiO_2$;
14 to 15% of $Al_2O_3$;
18 to 20% of $La_2O_3$; and optionally of one or several oxide(s) selected from the following oxides in the following molar percentages:

4 to 5% of ZnO;
4 to 5% of $MnO_2$;
2 to 3% of $B_2O_3$;
4 to 5% of CaO
0.1 to 1% of $Cr_2O_3$, wherein the composition (A) is selected from the group consisting of compositions A1 to A12 shown in the table below:

| Glass composition | $SiO_2$ Molar % | $SiO_2$ Mass % | $Al_2O_3$ Molar % | $Al_2O_3$ Mass % | CaO Molar % | CaO Mass % | ZnO Molar % | ZnO Mass % | $MnO_2$ Molar % | $MnO_2$ Mass % | $B_2O_3$ Molar % | $B_2O_3$ Mass % | $Cr_2O_3$ Molar % | $Cr_2O_3$ Mass % | $TiO_2$ Molar % | $TiO_2$ Mass % |
|---|---|---|---|---|---|---|---|---|---|---|---|---|---|---|---|---|
| A1 (CAS) | 40.00 | 38.60 | 10.00 | 16.37 | 50.00 | 45.03 | | | | | | | | | | |
| A2 (CAS_Cr2) | 39.80 | 38.13 | 9.95 | 16.18 | 49.75 | 44.49 | | | | | | | 0.5 | 1.21 | | |
| A3 (CAS_Cr) | 39.60 | 37.68 | 9.90 | 15.98 | 49.50 | 43.96 | | | | | | | 0.99 | 2.38 | | |
| A4 (CAS_B) | 39.02 | 37.55 | 9.76 | 15.93 | 48.78 | 43.80 | | | | | 2.44 | 2.72 | | | | |
| A5 (CAS_B2) | 38.10 | 36.55 | 9.52 | 15.51 | 47.62 | 42.64 | | | | | 4.76 | 5.29 | | | | |
| A6 (CAS_Mn2) | 39.02 | 37.53 | 9.76 | 15.92 | 48.78 | 43.78 | | | 2.44 | 2.77 | | | | | | |
| A7 (CAS_Mn) | 38.10 | 36.52 | 9.52 | 15.49 | 47.62 | 42.60 | | | 4.76 | 5.39 | | | | | | |
| A8 (CAS_Mn3) | 36.36 | 34.65 | 9.09 | 14.70 | 45.45 | 40.42 | | | 9.09 | 10.23 | | | | | | |
| A9 (CAS_Mn_Cr) | 37.74 | 35.69 | 9.43 | 15.14 | 47.17 | 41.64 | | | 4.72 | 5.27 | | | 0.94 | 2.26 | | |
| A10 (CAS_Zn) | 38.10 | 36.23 | 9.52 | 15.37 | 47.62 | 42.27 | 4.76 | 6.14 | | | | | | | | |
| A11 (CAS2BT) | 41.46 | 38.71 | 11.76 | 18.62 | 39.48 | 34.40 | | | | | 5.09 | 5.51 | | | 2.22 | 2.75 |
| A12 (CAS2B) | 42.4 | 39.81 | 12.02 | 19.15 | 40.37 | 35.38 | | | | | 5.20 | 5.66 | | | | |

22. The composition according to claim 21, which at the end of its elaboration and before any heat treatment only consists of an amorphous glassy phase.

23. The composition according to claim 21, wherein the glass composition comprises more than 50% by weight of crystalline phase, obtained by maintaining the glass composition according to claim 1 at a temperature plateau from 600° C. to 1,000° C., for a duration of more than 1 hour, said temperature plateau being reached by observing one or several temperature rise ramps at a rate from 0.5 to 3° C./minute.

24. The composition according to claim 21, wherein the composition (B) is selected from the group consisting of compositions B1 to B10 shown in the table below:

| Glass composition | $SiO_2$ % mol | $SiO_2$ % mass | $Al_2O_3$ % mol | $Al_2O_3$ % Mass | CaO % Mol | CaO % Mass | SrO % mol | SrO % mass | ZnO % mol | ZnO % mass | $MnO_2$ % mol | $MnO_2$ % mass | $B_2O_3$ % mol | $B_2O_3$ % mass | $Cr_2O_3$ % mol | $Cr_2O_3$ % mass |
|---|---|---|---|---|---|---|---|---|---|---|---|---|---|---|---|---|
| B1 (SCAS) | 47.62 | 36.55 | 4.76 | 6.20 | 9.52 | 6.82 | 38.10 | 50.43 | | | | | | | | |
| B2 (SCAS-Cr2) | 47.39 | 36.21 | 4.74 | 6.15 | 9.48 | 6.76 | 37.91 | 49.96 | | | | | | | 0.47 | 0.92 |
| B3 (SCAS-Cr) | 47.17 | 35.89 | 4.72 | 6.09 | 9.43 | 6.70 | 37.74 | 49.51 | | | | | | | 0.94 | 1.82 |
| B4 (SCAS-B) | 46.51 | 35.79 | 4.65 | 6.07 | 9.30 | 6.68 | 37.21 | 49.38 | | | | | 2.33 | 2.07 | | |
| B5 (SCAS-B2) | 45.45 | 35.06 | 4.55 | 5.95 | 9.09 | 6.95 | 36.36 | 48.38 | | | | | 4.55 | 4.06 | | |
| B6 (SCAS-Mn2) | 46.51 | 35.78 | 4.65 | 6.07 | 9.3 | 6.68 | 37.21 | 49.36 | | | 2.33 | 2.11 | | | | |
| B7 (SCAS-Mn) | 45.45 | 35.04 | 4.55 | 5.95 | 9.09 | 6.54 | 36.36 | 48.34 | | | 4.55 | 4.14 | | | | |
| B8 (SCAS-Mn3) | 43.48 | 33.65 | 4.35 | 5.71 | 8.7 | 6.28 | 34.78 | 46.42 | | | 8.7 | 7.94 | | | | |
| B9 (SCAS-Mn—Cr) | 45.05 | 34.43 | 4.5 | 5.84 | 9.01 | 6.43 | 36.04 | 47.50 | | | 4.5 | 4.06 | | | 0.9 | 1.74 |
| B10 (SCAS-Zn) | 45.45 | 34.82 | 4.55 | 5.91 | 9.09 | 6.50 | 36.36 | 48.05 | 4.55 | 4.72 | | | | | | |

25. The composition according to claim 21, wherein the composition (C) is selected from the group consisting of compositions C1 to C7 shown in the table below:

| Glass composition | $SiO_2$ % mol | $SiO_2$ % mass | $Al_2O_3$ % mol | $Al_2O_3$ % mass | $La_2O_3$ % mol | $La_2O_3$ % mass | ZnO % mol | ZnO % mass | $MnO_2$ % mol | $MnO_2$ % mass | $B_2O_3$ % mol | $B_2O_3$ % mass | CaO % mol | CaO % mass | $Cr_2O_3$ % mol | $Cr_2O_3$ % mass |
|---|---|---|---|---|---|---|---|---|---|---|---|---|---|---|---|---|
| C1(LAS) | 65.00 | 32.68 | 15.00 | 12.80 | 20.00 | 54.52 | | | | | | | | | | |
| C2 (LAS-Zn) | 61.90 | 31.60 | 14.29 | 12.38 | 19.05 | 52.73 | 4.76 | 3.29 | | | | | | | | |
| C3 (LAS-Mn) | 61.90 | 31.74 | 14.29 | 12.43 | 19.05 | 52.95 | | | 4.76 | 2.88 | | | | | | |
| C4 (LAS-B) | 63.41 | 32.21 | 14.63 | 12.61 | 19.51 | 53.74 | | | | | 2.44 | 1.44 | | | | |

-continued

| Glass composition | SiO₂ % mol | SiO₂ % mass | Al₂O₃ % mol | Al₂O₃ % mass | La₂O₃ % mol | La₂O₃ % mass | ZnO % mol | ZnO % mass | MnO₂ % mol | MnO₂ % mass | B₂O₃ % mol | B₂O₃ % mass | CaO % mol | CaO % mass | Cr₂O₃ % mol | Cr₂O₃ % mass |
|---|---|---|---|---|---|---|---|---|---|---|---|---|---|---|---|---|
| C5 (LAS-Ca) | 61.90 | 31.93 | 14.29 | 12.50 | 19.05 | 53.27 | | | | | | | 4.76 | 2.29 | | |
| C6 (LAS-Mn—Cr) | 61.32 | 31.35 | 14.15 | 12.28 | 18.87 | 52.31 | | | 4.72 | 2.85 | | | | | 0.94 | 1.22 |
| C7 (LAS-Cr) | 64.36 | 32.27 | 14.85 | 12.64 | 19.80 | 53.84 | | | | | | | | | 0.99 | 1.26 |

26. The composition according to claim 21, wherein the composition is in form of a powder.

27. A method for assembling at least two parts comprising the following successive steps:
   a) putting the parts into contact with a glass composition according to claim 21, thereby forming a first assembly comprising the parts and the glass composition;
   b) heating the assembly at a heating rate ranging between 0.5 and 3° C./min, said heating being optionally separated or interrupted by one or several temperature plateau(s), up to a temperature T1 sufficient for softening the glass composition in order to form a gasket between the parts; maintaining the assembly at a sufficient temperature T2, less than or equal to T1, and for a sufficient duration so that the glass composition solidifies and comprises more than 50% by weight of crystalline phase so as to form a second assembly comprising the parts and the gasket;
   c) cooling down the second assembly comprising the parts and the gasket to room temperature or an operating temperature.

28. The method according to claim 27, wherein the first assembly formed by the parts and the glass composition is maintained at a plateau at a temperature T2 from 600° C. to a 1,000° C. for a duration of more than 1 hour.

29. The method according to claim 27, wherein the step of putting the parts into contact with the glass composition comprises:
   forming a powder of the glass composition;
   suspending this powder in an organic binder so as to obtain a paste; and
   coating at least one surface of the parts to be assembled with the obtained paste.

30. The method according to claim 29, wherein before reaching the temperature T1, a plateau is observed at a sufficient temperature T3 for a sufficient duration for removing the organic binder.

31. The method according to claim 30, wherein during step b), the following procedure is carried out: raising the temperature at 0.5° C./minute from room temperature, plateau at 400° C. for 120 minutes, raising the temperature at 3° C./minute from 400° C.; plateau at 800-950° C. for 50 hours to 120 hours, lowering the temperature at a rate of 3° C./minute down to room temperature or down to an operating temperature.

32. The method according to claim 27, wherein the step of putting the parts into contact with the glass composition comprises preparing a glass part having a shape of the gasket to be formed and then setting this part into place between surfaces of the parts to be assembled.

33. The method according to claim 32, wherein said glass part is prepared by compacting and then sintering a powder of the glass composition in a mold matching the shape of the glass part.

34. The method according to claim 32, wherein said glass part is a solid, massive glass block prepared by direct casting of the molten glass composition into a mold matching the shape of the glass part.

35. The method according to claim 27, wherein the parts to be assembled comprise a material selected from the group consisting of metals, metal alloys, ceramics, and composite materials comprising several of the aforementioned materials.

36. The method according to claim 35, wherein said at least two parts to be assembled comprise different materials.

37. The method according to claim 27, wherein said at least two parts to be assembled are parts of a high temperature electrolyzer <<HTE>> or of a high temperature fuel cell <<SOFC>>.

38. A gasket obtained by the method according to claim 27.

39. An assembly obtained by the method according to claim 27.

40. A high temperature electrolyzer or high temperature fuel cell comprising a gasket according to claim 38.

41. The method according to claim 9, wherein before reaching the temperature T1, a plateau is observed at a sufficient temperature T3 for a sufficient duration for removing the organic binder for a duration from 60 to 180 minutes.

42. The method according to claim 29, wherein before reaching the temperature T1, a plateau is observed at a sufficient temperature T3 for a sufficient duration for removing the organic binder for a duration from 60 to 180 minutes.

* * * * *